United States Patent
Choi et al.

(10) Patent No.: US 12,504,423 B2
(45) Date of Patent: Dec. 23, 2025

(54) HUMAN IN VITRO CARDIOTOXICITY MODEL

(71) Applicants: Brown University, Providence, RI (US); Rhode Island Hospital, Providence, RI (US)

(72) Inventors: Bum-Rak Choi, Warwick, RI (US); Kareen L. K. Coulombe, Pawtucket, RI (US)

(73) Assignees: Brown University, Providence, RI (US); Rhode Island Hospital, Providence, RI (US)

( * ) Notice: Subject to any disclaimer, the term of this patent is extended or adjusted under 35 U.S.C. 154(b) by 275 days.

(21) Appl. No.: 17/502,800

(22) Filed: Oct. 15, 2021

(65) Prior Publication Data

US 2022/0163511 A1     May 26, 2022

Related U.S. Application Data

(60) Provisional application No. 63/092,649, filed on Oct. 16, 2020.

(51) Int. Cl.
*G01N 33/50* (2006.01)
(52) U.S. Cl.
CPC ............. *G01N 33/5014* (2013.01)
(58) Field of Classification Search
USPC .................................. 324/109, 71.1
See application file for complete search history.

(56) References Cited

U.S. PATENT DOCUMENTS

| | | | |
|---|---|---|---|
| 4,377,592 A * | 3/1983 | Aurousseau | A61K 31/38 514/821 |
| 8,318,488 B1 | 11/2012 | Bohlen et al. | |
| 8,497,252 B2 | 7/2013 | Hosoda et al. | |
| 8,703,483 B2 | 4/2014 | Cezar | |
| 9,085,756 B2 | 7/2015 | Fisk et al. | |

(Continued)

FOREIGN PATENT DOCUMENTS

| | | |
|---|---|---|
| AU | 2014323098 A1 | 5/2016 |
| CA | 2886396 A1 | 1/2014 |

(Continued)

OTHER PUBLICATIONS

Liu et al., "Human Embryonic Stem Cell-Derived Cardiomyocytes Restore Function in Infarcted Hearts of Non-Human Primates", Nature Biotechnology, vol. 36, Issue 7, 2018, pp. 597-605.

(Continued)

*Primary Examiner* — Vincent Q Nguyen
(74) *Attorney, Agent, or Firm* — Adler Pollock & Sheehan P.C.

(57) ABSTRACT

The Cardiac Tissue Engineered Model (TEEM) invention provides a robust in vitro model for cardiotoxicity evaluation using three-dimensional (3D) human heart microtissues to quantify dose-dependent changes in electromechanical activity, resulting in a comprehensive cardiotoxicity and arrhythmia risk assessment of test compounds. The invention also provides a predictive in vitro screening platform for pro-arrhythmic toxicity testing using human three-dimensional cardiac microtissues. The invention enables the screening of environmental and pharmaceutical compounds, chemicals, and toxicants to establish safe human exposure levels.

11 Claims, 8 Drawing Sheets

Specification includes a Sequence Listing.

(56) References Cited

U.S. PATENT DOCUMENTS

| | | | |
|---|---|---|---|
| 9,273,286 | B2 | 3/2016 | Ma |
| 10,048,275 | B2 | 8/2018 | Kralj et al. |
| 10,113,150 | B2 | 10/2018 | Wakatsuki |
| 2005/0049287 | A1* | 3/2005 | Ehring .............. A61K 31/235 514/448 |
| 2022/0205981 | A1* | 6/2022 | Coulombe ......... G01N 21/6428 |

FOREIGN PATENT DOCUMENTS

| | | |
|---|---|---|
| WO | 2017093524 A1 | 6/2017 |
| WO | 2018195166 A1 | 10/2018 |

OTHER PUBLICATIONS

Livak et al., "Analysis of Relative Gene Expression Data Using Real-Time Quantitative PCR and the 2-ΔΔCT Method", Methods, vol. 25, 2001, pp. 402-408.

Makarenko et al., "Passive Stiffness Changes Caused by Upregulation of Compliant Titin Isoforms in Human Dilated Cardiomyopathy Hearts", Circulation Research, vol. 95, No. 7, 2004, pp. 708-716.

Mason et al., "Electrocardiogramce Ranges Derived from 79,743 Ambulatory Subjects", Journal of Electrocardiology, vol. 40, No. 3, 2007, pp. 228-234e8.

McKim, Jr. et al., "Building a Tiered Approach to In Vitro Predictive Toxicity Screening: A Focus on Assays with In Vivo Relevance", Combinatorial Chemistry & High Throughput Screening, vol. 13, No. 2, 2010, pp. 188-206.

Miragoli et al., "Electrotonic Modulation of Cardiac Impulse Conduction by Myofibroblasts", Circulation Research, vol. 98, No. 6, 2006, pp. 801-810.

Munarin et al., "Laser-Etched Designs for Molding Hydrogel-Based Engineered Tissues", Tissue Engineering : Part C, vol. 23, Issue 5, 2017, pp. 311-321.

O'Hara et al., "Simulation of the Undiseased Human Cardiac Ventricular Action Potential: Model Formulation and Experimental Validation", PLOS Computational Biology, vol. 7, Issue 5, e1002061, May 2011, 29 pages.

O'Reilly et al., "Bisphenol A Binds to the Local Anesthetic Receptor Site to Block the Human Cardiac Sodium Channel", PLoS ONE, vol. 7, Issue 1, e41667, Jul. 27, 2012, pp. 1-11.

Okur et al., "Quantitative Evaluation of Ischemic Myocardial Scar Tissue by Unenhanced T1 Mapping Using 3.0 Tesla MR Scanner", Diagn Interv Radiol, vol. 20, 2014, pp. 407-413.

Onakpoya et al., "Post-Marketing Withdrawal of 462 Medicinal Products Because of Adverse Drug Reactions: A Systematic Review of the World Literature", BMC Medicine, vol. 14, No. 10, 2016, pp. 1-11.

Onakpoya et al., "Worldwide Withdrawal of medicinal products because of adverse drug reactions: a systematic Review and Analysis", Critical Reviews in Toxicology, vol. 46, No. 6, 2016, pp. 477-489.

Posnack et al., "The Adverse Cardiac Effects of Di(2-ethylhexyl)phthalate and Bisphenol A", Cardiovascular Toxicology, vol. 14, No. 4, May 9, 2014, pp. 339-357.

Quinn et al., "Electrotonic Coupling of Excitable and Nonexcitable Cells in the Heart Revealed by Optogenetics", Proceedings of the National Academy of Sciences (PNAS), vol. 113, No. 51, 2016, pp. 14852-14857.

Ramalho et al., "Drug-induced Life-Threatening Arrhythmias and Sudden Cardiac Death: A Clinical Perspective of Long QT, short QT and Brugada Syndromes", Portuguese Journal of Cardiology, vol. 37, No. 5, 2018, pp. 435-446.

Redfern et al., "Impact and Frequency of Different Toxicities Throughout the Pharmaceutical Life Cycle", The Toxicologist, e29, 2010, 1 page. (Abstract Only).

Riegler et al., "Human Engineered Heart Muscles Engraft and Survive Long-Term in a Rodent Myocardial Infarction Model", Circulation Research, vol. 117, Issue 8, Sep. 25, 2015, pp. 720-730.

Rinn et al., "Anatomic Demarcation by Positional Variation in Fibroblast Gene Expression Programs", PLoS Genetics, vol. 2, Issue 7, Jul. 2006, pp. 1084-1096.

Rook et al., "Differences in Gap Junction Channels Between Cardiac Myocytes, Fibroblasts, and Heterologous Pairs", American Journal of Physiology—Cell Physiology, vol. 263, No. 5, 1992, pp. C959-C977.

Rook et al., "Single Channel Currents of Homo- and Heterologous Gap Junctions Between Cardiac Fibroblasts and Myocytes", Pflfigers Arch, vol. 414, No. 1, 1989, pp. 95-98.

Ruan et al., "Mechanical Stress Conditioning and Electrical Stimulation Promote Contractility and Force Maturation of Induced Pluripotent Stem Cell-Derived Human Cardiac Tissue", Circulation, vol. 134, Issue 20, Nov. 15, 2016, pp. 1557-1567.

Rubart et al., "Electrical Coupling Between Ventricular Myocytes and Myofibroblasts in the Infarcted Mouse Heart", Cardiovascular Research, vol. 114, No. 3, 2017, 12 pages.

Rupert et al., "Human Cardiac Fibroblast Number and Activation State Modulate Electromechanical Function of hiPSC-Cardiomyocytes in Engineered Myocardium", Stem Cells International, vol. 2020, Article ID 9363809, 2020, 16 pages.

Rupert et al., "Hypertrophy Changes 3D Shape of hiPSC-Cardiomyocytes: Implications for Cellular Maturation in Regenerative Medicine", Cellular and Molecular Bioengineering, vol. 10, No. 1, Aug. 3, 2016, pp. 54-62.

Rupert et al., "IGF1 and NRG1 Enhance Proliferation, Metabolic Maturity, and the Force-Frequency Response in hESC-Derived Engineered Cardiac Tissues", Stem Cells International, vol. 2017, Article ID 7648409, 2017, 13 pages.

Rupert et al., "Practical Adoption of state-of-the-art hiPSC-cardiomyocyte Differentiation Techniques", PLoS One, vol. 15, Issue 3, e0230001, Mar. 10, 2020, pp. 1-13.

Rupert et al., "The Roles of Neuregulin-1 in Cardiac Development, Homeostasis, and Disease", Biomark Insights, vol. 10 (Suppl 1), 2015, pp. 1-9.

Sager et al., "Rechanneling the Cardiac Proarrhythmia Safety Paradigm: A Meeting Report from the Cardiac Safety Research Consortium", Cardiac Safety Research Consortium, American Heart Journal, vol. 167, No. 3, Mar. 2014, pp. 292-300.

Sekine et al., "Endothelial Cell Coculture Within Tissue-Engineered Cardiomyocyte Sheets Enhances Neovascularization and Improves Cardiac Function of Ischemic Hearts", Circulation, vol. 118, (14_suppl_1),, Mar. 7, 2015, pp. S145-S152.

Serrao et al., "Myocyte-Depleted Engineered Cardiac Tissues Support Therapeutic Potential of Mesenchymal Stem Cells", Tissue Engineering: Part A, vol. 18, Nos. 13 and 14, 2012, pp. 1322-1333.

Shah et al., "influence of Inherent Mechanophenotype on Competitive Cellular Adherence", Annals of Biomedical Engineering, vol. 45, No. 8, Aug. 2017, pp. 2036-2047.

Shinde et al., "The Role of α-Smooth Muscle Actin in Fibroblast-Mediated Matrix Contraction and Remodeling", Biochimica et Biophysica Acta, vol. 1863, No. 1, 2017, pp. 298-309.

Sousa et al., "Smooth Muscle a-Actin Expression and Myofibroblast Differentiation by TGFb are Dependent Upon MK2", Journal of Cellular Biochemistry, vol. 100, No. 6, 2007, pp. 1581-1592.

Strauss et al., "Comprehensive In Vitro Proarrhythmia Assay (CiPA) Update from a Cardiac Safety Research Consortium / Health and Environmental Sciences Institute / FDA Meeting", Therapeutic Innovation & Regulatory Science, vol. 53, No. 4, 2019, pp. 519-525.

Sullivan et al., "Extracellular Matrix Remodeling Following Myocardial Infarction Influences the Therapeutic Potential of Mesenchymal Stem Cells", Stem Cell Research & Therapy, vol. 5, No. 14, 2014, pp. 1-15.

Sun et al., "Brugada-Type Pattern on Electrocardiogram Associated with High-Dose Loperamide Abuse", The Journal of Emergency Medicine, vol. 54, No. 4, 2018, pp. 484-486.

Surawicz et al., "Cardiac Alternans: Diverse Mechanisms and Clinical Manifestations", Journals of the American College of Cardiology (JACC), vol. 20, No. 2, Aug. 1992, pp. 483-499.

Tandon et al., "Electrical Stimulation Systems for Cardiac Tissue Engineering", Nature Protocols, vol. 4, No. 2, Jan. 22, 2009, pp. 155-173.

(56) References Cited

OTHER PUBLICATIONS

Tiburcy et al., "Defined Engineered Human Myocardium With Advanced Maturation for Applications in Heart Failure Modeling and Repair", Circulation, vol. 135, Issue 19, May 9, 2017, pp. 1832-1847.
Tohyama et al., "Distinct Metabolic Flow Enables Large-Scale Purification of Mouse and Human Pluripotent Stem Cell-Derived Cardiomyocytes", Cell Stem Cell, vol. 12, Jan. 3, 2013, pp. 127-137.
Verkerk et al., "Patch-Clamp Recording from Human Induced Pluripotent Stem Cell-Derived Cardiomyocytes: Improving Action Potential Characteristics through Dynamic Clamp", International Journal of Molecular Sciences, vol. 18, No. 9, 2017, pp. 1-23.
Vozenin et al., "The Myofibroblast Markers -SM actin and β-actin are Differentially Expressed in 2 and 3-D Culture Models of Fibrotic and Normal Skin", Cytotechnology, vol. 26, No. 1, 1998, pp. 29-38.
Waldo et al., "Effect of d-sotalol on Mortality in Patients with left ventricular Dysfunction after Recent and Remote Myocardial Infarction", Lancet, vol. 348, No. 1, 1996, pp. 7-12.
Walsh et al., "β-adrenergic Modulation of Cardiac Ion Channels: Differential Temperature Sensitivity of Potassium and Calcium Currents", Journal of General Physiology, vol. 93, No. 5, 1989, pp. 841-854.
Wendel et al., "Functional Effects of a Tissue-Engineered Cardiac Patch From Human Induced Pluripotent Stem Cell-Derived Cardiomyocytes in a Rat Infarct Model", Stem Cells Translational Medicine, vol. 4, No. 11, Sep. 14, 2015, pp. 1324-1332.
Yan et al., "Bisphenol A and 17b-Estradiol Promote Arrhythmia in the Female Heart via Alteration of Calcium Handling", PLoS ONE, vol. 6, Issue 9, Sep. 2011, pp. 1-9.
Zhang et al., "Generation of Quiescent Cardiac Fibroblasts From Human Induced Pluripotent Stem Cells for In Vitro Modeling of Cardiac Fibrosis", Circulation Research, vol. 125, No. 5, 2019, pp. 552-566.
Zhao et al., "A Multimaterial Microphysiological Platform Enabled by Rapid Casting of Elastic Microwires", Advanced Healthcare Materials, vol. 8, No. 5, e1801187, 2019, pp. 1-10.
Zhou et al., "Characterization and Standardization of Cultured Cardiac Fibroblasts for ex vivo Models of Heart Fibrosis and Heart Ischemia", Tissue Eng Part C Methods, vol. 12, No. 8, 2017, 43 pages.
Zhou et al., "Recounting Cardiac Cellular Composition", Circulation Research, vol. 118, No. 3, Mar. 2, 2016, pp. 368-370.
"A Strategic Roadmap for Establishing New Approaches to Evaluate the Safety of Chemicals and Medical Products in the United States", Interagency Coordinating Committee on the Validation of Alternative Methods, Jan. 2018, pp. 441-452.
"Assessment of Pro-Arrhythmic Effects Using Pluricyte® Cardiomyocytes", on the ACEA xCELLigence® RTCA CardioECR, Mar. 2018, 15 pages.
"Preliminary Report: Effect of Encainide and Flecainide on Mortality in a Randomized Trial of Arrhythmia Suppression after Myocardial Infarction", The New England Journal of Medicine (NEJM), vol. 321, No. 6, 1989, pp. 406-412.
"Ranexa: Ranolazine Extended-Release tTblets", CV Therapeutics, NDA 21-526/S-002 Approval Letter, 2006, 13 pages.
Alinejad et al., "A systematic Review of the Cardiotoxicity of Methadone", EXCLI Journal, vol. 14, May 5, 2015, pp. 577-600.
Anversa et al., "Absolute Morphometric Study of Myocardial Hypertrophy in Experimental Hypertension. II. Ultrastructure of Myocytes and Interstitium", Laboratory Investigation, vol. 38, No. 5, May 1, 1978, pp. 597-609. (Abstract Only).
Anversa et al., "Stereological Measurement of Cellular and Subcellular Hypertrophy and Hyperplasia in the Papillary Muscle of Adult Rat", Journal of Molecular and Cellular Cardiology (JMCC), vol. 12, No. 8, 1980, pp. 781-795.
Armoundas et al., "Prognostic Significance of Electrical Alternans Versus Signal Averaged Electrocardiogram Predicting the Outcome of Electrophysiological Testing and Arrhythmia-Free Survival", Heart, vol. 80, 1998, pp. 251-256.

Asazuma-Nakamura et al., "Cx43 Contributes to TGF-β Signaling to Regulate Differentiation of Cardiac Fibroblasts into Myofibroblasts", Experimental Cell Research, vol. 315, No. 7, 2009, pp. 1190-1199.
Bashey et al., "Growth Properties and Biochemical Characterization of Collagens Synthesized by Adult Rat Heart Fibroblasts in Culture", Journal of Molecular and Cellular Cardiology, vol. 24, No. 7, 1992, pp. 691-700.
Beauchamp et al., "3D Co-culture of hiPSC-Derived Cardiomyocytes With Cardiac Fibroblasts Improves Tissue-Like Features of Cardiac Spheroids", Frontiers in Molecular Biosciences, vol. 7, Article 14, Feb. 2020, 17 pages.
Bergmann et al., "Dynamics of Cell Generation and Turnover in the Human Heart", Cell, vol. 161, No. 7, Jun. 18, 2015, pp. 1566-1575.
Bielawski et al., "Real-Time Force and Frequency Analysis of Engineered Human Heart Tissue Derived from Induced Pluripotent Stem Cells Using Magnetic Sensing", Tissue Engineering,, 2016, 31 pages.
Blinova et al., "Comprehensive Translational Assessment of Human-Induced Pluripotent Stem Cell Derived Cardiomyocytes for Evaluating Drug-Induced Arrhythmias", Toxicological Sciences, vol. 155, No. 1, 2017, pp. 234-247.
Blinova et al., "International Multisite Study of Human-Induced Pluripotent Stem Cell-Derived Cardiomyocytes for Drug Proarrhythmic Potential Assessment", Cell Reports, vol. 24, No. 13, Sep. 25, 2018, pp. 3582-3592.
Burridge et al., "Chemically Defined Generation of Human Cardiomyocytes", Nature Methods, vol. 11, No. 8, Aug. 2014, pp. 855-860.
Chen et al., "Application of the Cell Sheet Technique in Tissue Engineering (Review)", Biomedical Reports, vol. 3, No. 6, 2015, pp. 749-757.
Chong et al., "Human Embryonic-Stem-Cell-Derived Cardiomyocytes Regenerate Non-Human Primate Hearts", Nature, vol. 510, No. 7504, 2014, pp. 273-277.
Clement et al., "Expression and Function of β-Smooth Muscle Actin During Embryonic-Stem-Cell-Derived Ardiomyocyte Differentiation", Journal of Cell Science, vol. 120, No. 2, 2007, pp. 229-238.
Colatsky et al., "The Comprehensive in Vitro Proarrhythmia Assay (CiPA) Initiative—Update on Progress", Journal of Pharmacological and Toxicological Methods, vol. 81, 2016, pp. 15-20.
Desai et al., "Reversible Modulation of Myofibroblast Differentiation in Adipose-Derived Mesenchymal Stem Cells", PLOS ONE, vol. 9, Issue 1, Jan. 2014, 12 pages.
Doble et al., "Basic Fibroblast Growth Factor Stimulates connexin-43 Expression and Intercellular Communication of Cardiac Fibroblasts", Molecular and Cellular Biochemistry, vol. 143, No. 1, 1995, pp. 81-87.
Dolnikov et al., "Functional Properties of Human Embryonic Stem Cell-Derived Cardiomyocytes: Intracellular Ca2? Handling and the Role of Sarcoplasmic Reticulum in the Contraction", Cells, vol. 21, No. 2, 2006, pp. 236-245.
Dutta et al., "Optimization of an In silico Cardiac Cell Model for Proarrhythmia Risk Assessment", Frontiers in Physiology, vol. 8, Article 616, Aug. 23, 2017, pp. 1-15.
Efimov et al., "Optical Mapping of Repolarization and Refractoriness from Intact Hearts", Circulation, vol. 90, No. 3, Sep. 1994, pp. 1469-1480.
Eghbali et al., "Localization of Types I, III and IV Collagen mRNAs in Rat Heart Cells by in situ Hybridization", Journal of Molecular and Cellular Cardiology, vol. 21, No. 1, 1989, pp. 103-113.
Evans et al., "TGF-β1-Mediated Fibroblast-Myofibroblast Terminal Differentiation—The Role of Smad Proteins", Experimental Cell Research, vol. 282, 2003, pp. 90-100.
Fahrenbach et al., "The Relevance of Non-Excitable Cells for Cardiac Pacemaker Function", Journal of Physiology, vol. 585.2, Oct. 4, 2007, pp. 565-578.
Fassbender, Melissa, "The Global Market for in Vitro Toxicity Testing is Predicted to Reach $8.Sbn by 2023", Accsses through "https://www.outsourcing-pharma.com/Article/2018/08/02/Global-in-vitro-toxicity-testing-market-to-reach-8.8bn-by-2023", Aug. 2, 2018, 3 pages.

(56) References Cited

OTHER PUBLICATIONS

Fenichel et al., "Drug-Induced Torsade de Pointes and Implications for Drug Development", Journal of Cardiovascular Electrophysiology (JCE), vol. 15, No. 4, 2004, pp. 475-495.

Ferdinandy et al., "Definition of Hidden Drug Cardiotoxicity: Paradigmchange in Cardiac Safety Testing and its Clinical Implications", European Heart Journal, 2018, pp. 1-10.

Feric et al., "Engineered Cardiac Tissues Generated in the Biowire II: A Platform for Human-Based Drug Discovery", Toxicological Sciences, vol. 172, No. 1, 2019, pp. 89-97.

Gao et al., "Impact of Bisphenol A on the Cardiovascular System—Epidemiological and Experimental Evidence and Molecular Mechanisms", International Journal of Environmental Research and Public Health, vol. 11, No. 8, 2014, pp. 8399-8413.

Gerbin et al., "Enhanced Electrical Integration of Engineered Human Myocardium via Intramyocardial versus Epicardial Delivery in Infarcted Rat Hearts", PLoS One, vol. 10, No. 7, e0131446, Jul. 10, 2015, pp. 1-20.

Granato et al., "Generation and Analysis of Spheroids from Human Primary Skin Myofibroblasts: An Experimental System to Study Myofibroblasts Deactivation", Cell Death Discovery, vol. 3, No. 17038, Jul. 17, 2017, 10 pages.

Grimm et al., "A Human Population-Based Organotypic in Vitro Model for Cardiotoxicity Screening", ALTEX, vol. 35, No. 4, 2018, pp. 441-452.

Hayakawa et al., "Noninvasive Evaluation of Contractile Behavior of Cardiomyocyte Monolayers Based on Motion Vector Analysis", Tissue Engineering: Part C, vol. 18, No. 1, Jan. 1, 2012, pp. 21-32.

Heranval et al., "Drugs with Potential Cardiac Adverse Effects: Retrospective Study in a Large Cohort of Parkinsonian Patients", Revue Neurologique, vol. 172, No. 4-5, 2016, pp. 318-323.

Herper, Matthew, "The Truly Staggering Cost of Inventing New Drugs", Accessed through "https://www.forbes.com/sites/matthewherper/2012/02/10/the-truly-staggering-cost-of-inventing-new-drugs/?sh=17dbe6bb4a94", Feb. 10, 2012, 5 pages.

Huang et al., "Matrix Stiffness-Induced Myofibroblast Differentiation Is Mediated by Intrinsic Mechanotransduction", American Journal of Respiratory Cell and Molecular Biology, vol. 47, Issue 3, Sep. 2012, pp. 340-348.

"International Search Report and Written Opinion received in International Application No. PCT/US2020/033394, mailed on Aug. 18, 2020", Aug. 18, 2020, 9 pages.

Ivey et al., "Defining the Cardiac Fibroblast", Circulation Journal, vol. 80, No. 11, Nov. 2016, pp. 2269-2276.

Jackman et al., "Engineered Cardiac Tissue Patch Maintains Structural and Electrical Properties After Epicardial Implantation", Biomaterials, vol. 159, 2018, pp. 48-58.

Johannesen et al., "Differentiating Drug-Induced Multichannel Block on the Electrocardiogram: Randomized Study of Dofetilide, Quinidine, Ranolazine, and Verapamil", Clinical pharmacology & Therapeutics, vol. 96, No. 5, Nov. 2014, pp. 549-558.

Johannesen et al., "Late Sodium Current Block for Drug-Induced Long QT Syndrome: Results From a Prospective Clinical Trial", Clinical Pharmacology & Therapeutics, vol. 99, No. 2, 2016, pp. 214-223.

Kofron et al., "A Predictive in vitro Risk Assessment Platform for Pro Arrhythmic Toxicity Using Human 3D Cardiac Microtissues", Scientific Reports, vol. 11, No. 10228, 2021, 16 pages.

Kofron et al., "Gq-Activated Fibroblasts Induce Cardiomyocyte Action Potential Prolongation and Automaticity in a 3D Microtissue Environment", American Journal of Physiology-Heart and Circulatory Physiology, vol. 313, No. 4, Jul. 14, 2017, 41 pages.

Kollmannsberger et al., "Tensile Forces Drive a Reversible Fibroblast-to-Myofibroblast Transition During Tissue Growth in Engineered Clefts", Science Advances, vol. 4, No. 1, eaao4881, Jan. 17, 2018, pp. 1-10.

Kreutziger et al., "Developing Vasculature and Stroma in Engineered Human Myocardium", Tissue Engineering: Part A, vol. 17, Nos. 9 and 10, 2011, pp. 1219-1228.

Lemoine et al., "Human Induced Pluripotent Stem Cell-Derived Engineered Heart Tissue as a Sensitive Test System for QT Prolongation and Arrhythmic Triggers", Circulation: Arrhythmia and Electrophysiology, vol. 11, e006035., Jul. 2018, 15 pages.

\* cited by examiner

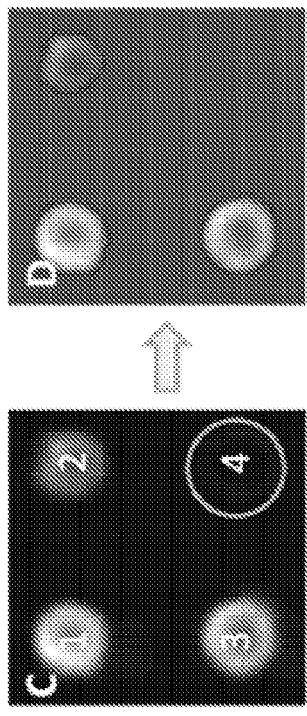
FIG. 4A
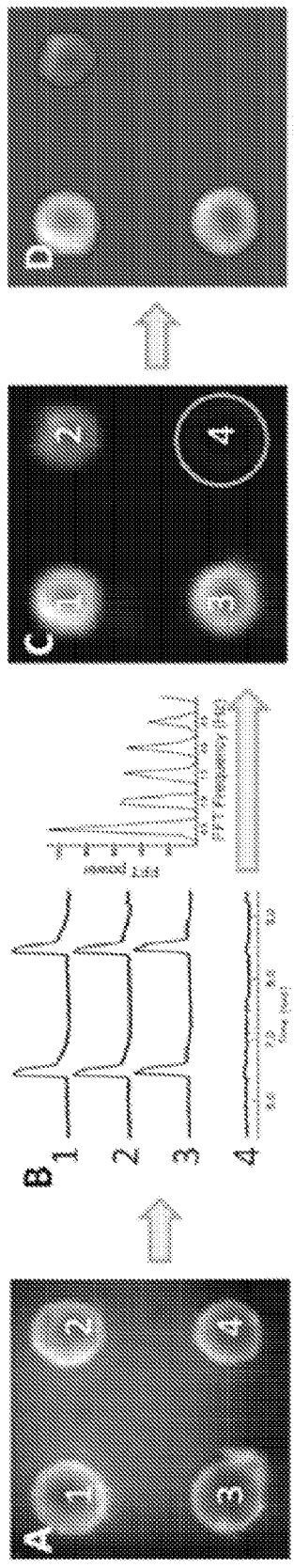
FIG. 4B
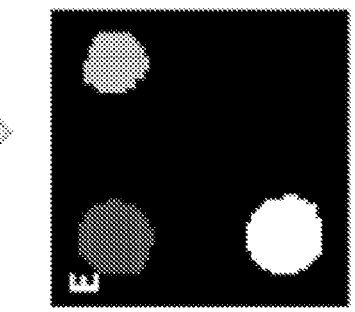
FIG. 4C
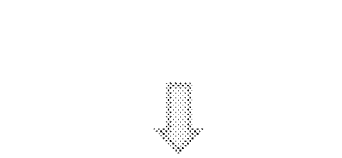
FIG. 4D
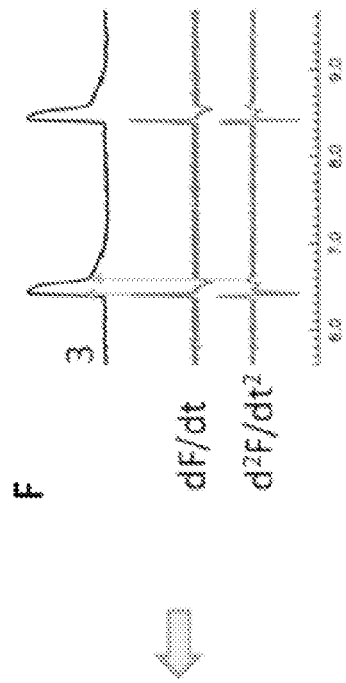
FIG. 4E
FIG. 4F
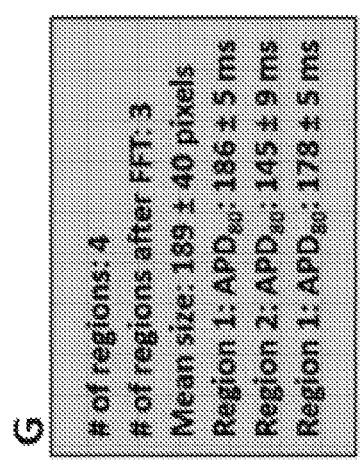
FIG. 4G

100

(1) identifying the end of the rapid or maximum repolarization rate (MxR) in an action potential trace

(2) where the action potential trace does not coincide with the stable baseline of the action potential, identifying the "foot" in the action potential trace (FIGs. 3A-3C, FIGs. 8A-8C), where a duration of elevated membrane potential slowly returns to the baseline voltage level

(3) where the late phase 3 early afterdepolarization is an extrasystole that occurs during the late phase of action potential, identifying that the subject has an elevated risk of tachyarrhythmia or conduction block

(4) taking the second derivative of the signal ($d^2F/dt^2$) to locate inflection points at all phase transitions in the action potential

(5) identifying alterations in early repolarization

FIG. 7

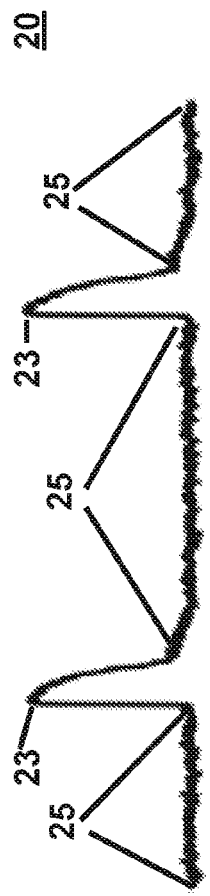
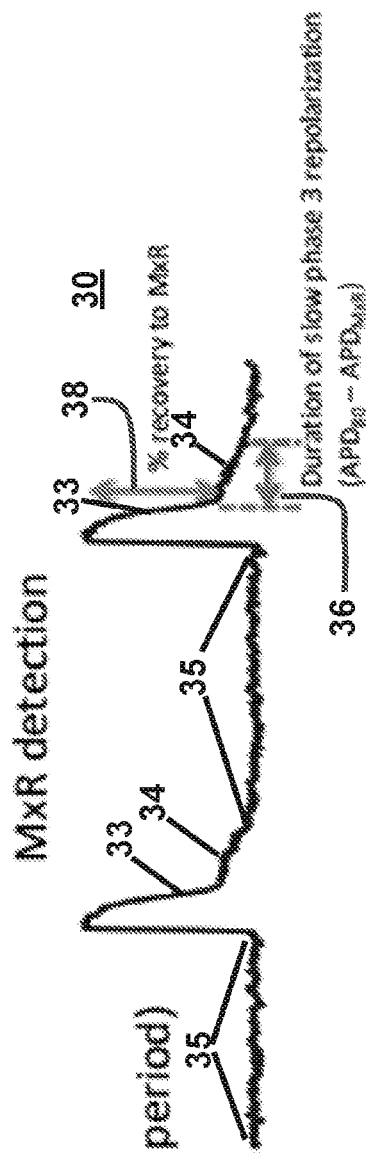
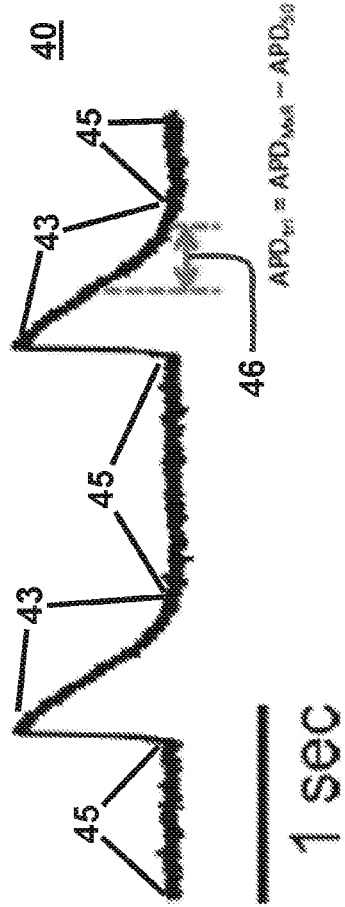
A. Typical AP under CTR condition
FIG. 8A
B. Elevated Foot (Elevated $V_m$ in late phase 3 period) (1 μM BPA)
FIG. 8B
C. AP Triangulation (100 μM ranolazine)
FIG. 8C

SEQUENCE LISTING

<160> NUMBER OF SEQ ID NOS: 4

<210> SEQ ID NO 1
<211> LENGTH: 19
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 1
ccgaccgaat gcagaagga                                                19

<210> SEQ ID NO 2
<211> LENGTH: 21
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 2
acagagtatt tgcgctccga a                                             21

<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 3
cttttggagt gaccagcaac                                               20

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 4
tgaagctgaa catgaccgta                                               20

HUMAN IN VITRO CARDIOTOXICITY MODEL

CROSS-REFERENCE TO RELATED APPLICATIONS

This patent matter is related to and claims priority to the provisional patent applications U.S. Ser. No. 63/092,649, filed Oct. 16, 2020, entitled "A human in vitro cardiotoxicity model."

This patent matter is also related to PCT/US20/33394, filed May 18, 2020, the contents of which are incorporated by reference.

STATEMENT REGARDING FEDERALLY SPONSORED RESEARCH OR DEVELOPMENT

This invention was made with government support under U01 ES028184 and R01HL135091 awarded by the National Institutes of Health. The government has certain rights in the invention.

FIELD OF THE INVENTION

This invention relates generally to propagating, preserving, or maintaining cells in culture media, e.g., totipotent, pluripotent, or multipotent progenitor or precursor cells by tissue culture techniques, e.g., human or animal living cells or tissues, e.g., cardiomyocytes or heart cells. This invention also relates to testing for cardiovascular effects of chemicals and compounds, e.g., industrial chemicals and additives, pharmaceutical drugs and compounds in development, and molecules that are environmental toxicants.

SEQUENCE LISTING

The instant application contains a Sequence Listing which has been submitted electronically in ASCII format and is hereby incorporated by reference in its entirety. Said ASCII copy, created on Dec. 28, 2021, is named 405505-668001US_SL.txt and is 1,197 bytes in size.

BACKGROUND OF THE INVENTION

The cardiac effects of environmental and industrial chemicals and pharmaceutical drugs can be severe, even life threatening. This severity necessitates a thorough evaluation of the human response to chemical compounds to protect the safety of people and the environment. The U.S. Food and Drug Administration (FDA) requires that pharmaceutical drugs be tested for cardiotoxicity during drug development to reduce the risk of life-threatening cardiac arrhythmias. But pharmaceutical failure due to fatal arrhythmia is a major reason for post-market withdrawal, which increases the costs of developing new drugs.

The U.S. Environmental Protection Agency's ToxCast and Tox21 efforts synthesize and advance computational approaches to chemical safety evaluation. Nevertheless, the World Health Organization estimates that up to 23% of global cardiovascular disease may arise from chemical exposure. See Prüss-Üstün & Corvalán, World Health Organization (2006).

The high prevalence of drug-induced cardiotoxicity despite screening efforts has raised questions about the effectiveness of cardiac screening using methods and standards that include in silico, in vitro, and animal models. Initiatives set forth by the Interagency Coordinating Committee on the Validation of Alternative Methods (ICCVAM) call for the development and implementation of non-animal methods of assessing potential hazards associated with acute and chronic exposures to industrial chemicals and medical products. These initiatives point to a value in testing platforms based on a mechanistic understanding of cardiac biology and compound responses.

There remains a need in the cardiac testing art for a more predictive human testing platform to enhance the risk stratification of cardiotoxicity. There is a need to predict mechanism of action and arrhythmia risk rapidly and effectively because arrhythmia increases the risk for stroke, heart attack, heart failure, and sudden cardiac death.

SUMMARY OF THE INVENTION

The invention provides the Cardiac Tissue Engineered Model (TEEM), a robust in vitro model for cardiac assessment using three-dimensional (3D) human heart engineered tissues at a micro-scale (µm) and macro-scale (mm to cm) to quantify dose-dependent changes in electromechanical function and metabolic activity, calcium signaling and function, cell viability and cytotoxicity, and cellular and tissue structure for acute and chronic chemical exposure, resulting in a comprehensive assessment of test compounds for efficacy, mechanism of action, and toxicity risk. The invention also provides a predictive in vitro screening platform for pro-arrhythmic toxicity testing using human three-dimensional cardiac microtissues. The invention enables the screening of diverse genetic backgrounds for personalized medicine and population studies based on sex, race/ethnicity, disease status, and genetic background by using lines of human pluripotent stem cells to derive cardiomyocytes (atrial and ventricular) and cardiac fibroblasts. The invention enables the screening of chemicals, environmental toxicants, and pharmaceutical compounds to establish safe human exposure levels.

In one advantage of the invention, this tissue-engineered model responds appropriately to human physiological stimuli. In another advantage of the invention, this tissue-engineered model differentiates between high-risk and low-risk compounds by exhibiting HERG blockade with an integrated, multi-ion-channel response. In yet another advantage of the invention, this tissue-engineered model has a proven human-specific response to known physiological interventions such as the beta-adrenergic stimulant isoproterenol and faster pacing rates and to known ion channel inhibitors (e.g., E4031) and ion channel activators (e.g., BayK8644). In still another advantage of the invention, this tissue-engineered model has a proven human-specific arrhythmogenic response to the environmental endocrine-disrupting chemical bisphenol-A (BPA). The response shows an acute and sensitive disruption of action potential initiation in the nanomolar range. Thus, the invention addresses many of the current needs for screening industrial, environmental, and pharmaceutical chemicals and compounds to establish safe human exposure levels.

In a first embodiment, the invention provides a method of evaluating alterations in late repolarization in a subject, comprising the steps of (1) identifying the end of the rapid or maximum repolarization rate (MxR) in an action potential trace; and (2) where the action potential trace does not coincide with the stable baseline of the action potential, identifying the "foot" in the action potential trace (FIGS. 3A-C, middle trace), where a duration of elevated membrane potential slowly returns to the baseline voltage level. In a second embodiment, the method further comprises the step of (3) where the late phase 3 early afterdepolarization is an extrasystole that occurs during the late phase of action potential, identifying that the subject has an elevated risk of tachyarrhythmia or conduction block. In a third embodiment, the method further comprises the step of (3) taking the second derivative of the signal ($d^2F/dt^2$) to locate inflection points at all phase transitions in the action potential. In a fourth embodiment, the method further comprises the step of (4) taking the second derivative of the signal ($d^2F/dt^2$) to locate inflection points at all phase transitions in the action potential; and (5) identifying alterations in early repolarization. In a fifth embodiment, the duration of slow repolarization is quantified by $APD_{80}$-$APD_{MxR}$ (red arrow), In sixth embodiment, the severity of slow phase 3 repolarization is further quantified by the percent recovery of the action potential from peak voltage at the inflection point (blue arrow). These new metrics describe the severity of slow repolarization that can indicate high risks for triggered activity.

In a seventh embodiment, the method of treatment comprises the steps of limiting chemical compound exposure to safe limits in human patients based on the dose-response of metrics measure in 3D human cardiac microtissues. These guidelines are for clinical use, for example, in first-in-human clinical trials. Safe doses are defined as those that do not change electrophysiological metrics to an extent that would induce arrhythmias in human patients. An increase in $APD_{80}$, $APD_{90}$, and/or $APD_{MxR}$ by greater than 13% correlates with clinical measures of QTc interval increasing >60 milliseconds (from peak non-arrhythmic APD of 440 milliseconds, or a 13% increase). Reduction in excitability correlates with conduction block severity such that 50% excitability is 2:1 block; 33% excitability is 3:1 block, etc. Increase stimulation time delay >20 ms and slowed upstroke (>100% increase) correlate with slow conduction, QRS complex widening (>100 milliseconds which is equal to >100% increase), and induction of ventricular tachycardia. Increase in action potential triangulation ($APD_{tri}$) of >10% and APD shortening correlate with increased metabolic stress, ischemia, and ST segment elevation. Increase in the slope of the $APD_{tri}$ versus $APD_{MxR}$ relationship before and after chemical compound exposure is an indication of $I_{Kr}$ and HERG channel blockade, which is a high-risk concern for QT prolongation, EADs/DADs, and ventricular arrhythmias such as Torsades de Pointes, and would provide an upper limit for safe human exposure.

BRIEF DESCRIPTION OF THE DRAWINGS

FIG. 1A shows the stimulation protocol designed to capture CaT dynamics including under stress (S2) and recovery (S3). FIG. 1B shows the CaT metrics to detect cardiotoxicity: delay between stimulation and CaT upstroke, rise time, CaT amplitude, decay time constant (T) from a single exponential curve fit, and duration at 75% recovery. CaTs were recorded using Rhod-2/AM. FIG. 1C is an example of spontaneous activity increased by 100 nM isoproterenol. Activation Interval (AI), the time between two CaTs, will be measured before and after drug perfusion to detect altered spontaneous activity. CaTs recorded with the genetically encoded optogenetic probe GCaMP.

FIG. 2A is a result of computer modeling to study the impact of $I_{Kr}$ blockade on $APD_{tri}$ using the O'Hara human myocyte model. See O'Hara et al., PLOS Comput. Biol. (2011). The conductance of $I_{Na}$, $I_{to}$, $I_{Ca}$, $I_{Kr}$, $I_{Ks}$ were varied to have a Gaussian distribution of APDs in 10,000 cells (original parameters in O'Hara et al. ±20%). $APD_{tri}$ changes under $I_{Kr}$ block were investigated. Increase of $I_{Kr}$ blockade (from black to blue, green, orange, and red) increases $APD_{tri}$ as $APD_{MxR}$ increases (plot, left) and steepens the slope of $APD_{tri}$ versus $APD_{MxR}$ (bar graph, right). FIG. 2B The slope of $APD_{tri}$ versus $APD_{MxR}$ steepened in response to 1 µM E4031, in agreement with the results from the computer modeling in panel A. The slope significantly increases between 0 and 1 µM E4031 (right, p=0.011). FIG. 2C 0.5 mM 4-AP ($I_{to}$ blockade) did not steepen the slope of $APD_{tri}$ versus $APD_{MxR}$ despite APD prolongation (p=0.199). FIG. 2D 300 nM BayK8644 ($I_{Ca}$ agonist) did not steepen $APD_{tri}$ versus $APD_{MxR}$ despite APD prolongation (p=0.539).

FIG. 3A is an example trace of typical action potential shape under control condition showing a rapid action potential upstroke and plateau followed by repolarization of action potential reaching to the baseline quickly. FIG. 3B is an example trace of two step repolarization showing an initial rapid repolarization followed by slow repolarization reaching the baseline. The MxR metric using the maximum of $d^2F/dt^2$ can automatically detect the inflection time point between two step repolarizations. The duration of slow repolarization (the second step) is defined by $APD_{80}$-$APD_{MxR}$ (red arrow). The percent of recovery at the infection point (blue arrow) is also useful to quantify the severity of slow repolarization during phase 3 of the action potential. FIG. 3C is an example of triangular shape action potentials. When action potential shape is triangular, $APD_{50}$ is much shorter than $APD_{MxR}$ (red arrow).

FIGS. 4A-G show an automated analysis pipeline from fluorescence signals obtained during optical mapping. FIG. 4A A greyscale snapshot of fluorescence from microtissues at 3.2× magnification (during optical mapping. Individual microtissues are numbered 1-4. FIG. 4B Sample membrane voltage (Vm) traces recorded from the corresponding microtissues in panel A. Note that electrical stimulation did not evoke APs in microtissue #4 (where the fluorescence trace shows a flat line). Fast Fourier transform (FFT) was used to distinguish responsive microtissues from non-responsive microtissues lacking APs. FIG. 4C FFTmax image. The microtissue (#4) without APs is automatically removed in FFTmax (circle). FIG. 4D Automated thresholding using Otsu's thresholding. FIG. 4E Blob coloring algorithm to detect individual microtissues. Signals within the same microtissue are averaged to acquire high signal-to-noise ratio and fidelity of data analysis. FIG. 4F Automated analysis (of sample trace #3, black) uses the first derivative (dF/dt, red trace) for detecting action potential upstroke to calculate duration to 80% recovery (APD80, see FIG. 4G or uses the maximum peak of the second derivative ($d2F/dt2$, blue trace) for assessing the end of maximum repolarization rate to calculate action potential duration APDMxR.1 APDMxR is useful when motion artifacts or other interference on fluorescence recordings such as fluctuation in water level is suspected to elevate fluorescence level during repolarization and reproducible APD80 measurement with low variation is not as reliable. FIG. 4G Sample output shows APD80 statistics from the three excitable individual microtissues.

FIG. 6A is an illustration of moving average subtraction. The top traces show a sample trace of action potential (black), moving averages with 55 window size averaging (red), and moving average subtraction (blue) calculated by subtracting the original trace from the moving averages. The zoomed traces during action potential upstroke (bottom left) shows that the maximum of moving average subtraction occurs during the initial rise of action potential upstroke and the minimum of moving average subtraction occurs near the peak of the action potential upstroke (see green arrows), demonstrating that moving average subtraction method allows reliable measurements of the rise time of the action potentials. In addition, the maximum of moving average subtraction during repolarization can be used to detect APDMXR. FIG. 6B is a set of plots of moving average subtraction with small (red) and large (blue) window sizes. The maximum and minimum of moving average subtractions are insensitive to the choice of the window size (17 vs. 95), demonstrating that the moving average subtraction can give reliable measurements of the action potential rise times and can be compared reliably in a broad range of signal-to-noise ratio.

FIG. 7 shows a method flow diagram 100 of evaluating alterations in late repolarization in a subject, comprising the steps of (1), (2), (3), (4), and (5).

FIG. 8A shows a typical AP (action potential) under control (CTR) condition 20 with rapid action potential upstrokes 23, and repolarization of AP reaching to the stable baseline of the AP at areas 25.

FIG. 8B shows an example trace of two step repolarization 30 showing an initial rapid repolarization 33 followed by slow repolarization (or "foot") 34 reaching the baseline 35. The MxR metric using the maximum of $d^2F/dt^2$ can automatically detect the inflection time point between two step repolarizations. The duration of slow repolarization (the second step) is defined by APD80-APDMxR (arrow 36). The percent of recovery at the infection point (arrow 38) is also useful to quantify the severity of slow repolarization during phase 3 of the action potential.

FIG. 8C shows an example 40 of triangular shape action potentials 43 with baseline 45; when action potential shape is triangular 43, APD50 is much shorter than APDMxR (e.g., arrow 46).

DETAILED DESCRIPTION OF THE INVENTION

Industrial Applicability

Figure 1A:
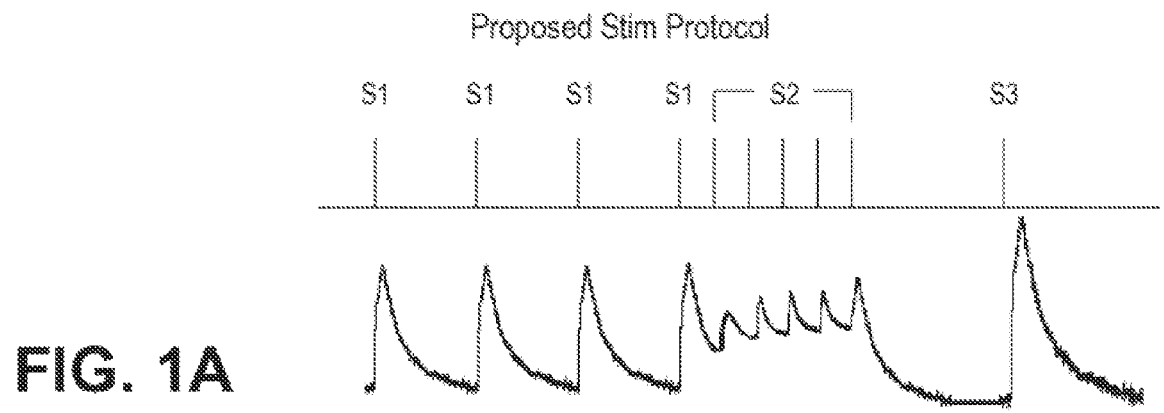
FIGS. 1A-C are a set of graphs showing the stimulation protocol and CaT metrics.

It is well recognized in the cardiotoxicity testing art that the HERG assay does not assess all drug-induced cardiac arrhythmia mechanisms and can lead to unnecessary discontinuation of compounds from development. See Ferdinandy et al., Eur. Heart J. (2018); Alinejad et al., EXCLI J. (2015); Heranval et al., Rev. Neurol. (Paris) (a); Sun et al., J. Emerg. Med. (2018); and Ramalho & Freitas, Rev. Port. Cardiol. (2018). The current standard for cardiotoxicity testing using the HERG assay is widely viewed as insufficient. See Sager et al., Am. Heart J. (2014).

The invention makes important advances beyond what is proposed by the FDA CiPA initiative using hPSC-CMs, particularly for using a three-dimensional model and high-resolution quantitative metrics compared to two-dimensional hPSC-CM assays in use by the FDA CiPA initiative, which is a component.

The invention provides other ways to curb the loss of time and money with current drug failures due to cardiotoxicity, which cause at 27% preclinical and 45% post market withdrawal.

The reduced return on investment (ROI) for pharma globally suggests that measures to make the drug development pipeline leaner should be favorably received. The invention could do this in several ways through the scientific underpinnings to accurately predict arrhythmia, implementation in early phases of drug development, and potential future reduction in costly animal testing. Further alignment of the invention with the Health and Environmental Sciences Institute can drive broad adoption by pharma and other agencies needing and evaluating toxicity testing data (such as the FDA and EPA) to increase the market value and size.

To be predictive of actual adverse clinical arrhythmic risk, arrhythmia models for drugs should be expanded to evaluate both trigger and substrate mechanisms for reentry in a human cardiac electrophysiology platform that can represent the diverse human population and comorbidities. The invention provides the basis for evaluating substrate-based mechanisms leading to arrhythmia risk, and other mechanisms of cardiotoxicity like structural and metabolic cardiotoxicity.

The invention also provides highly predictive preclinical models of human drug-induced proarrhythmic risk using hPSC-CMs and human cardiac fibroblasts in larger three-dimensional engineered tissues for testing arrhythmia substrates such as slow conduction and reentry formation as a secondary screening platform.

The invention provides a screening platform that can be validated to represent the most vulnerable subpopulation in genetically diverse human population and comorbidities such as ischemia, myocardial infarction, and heart failure.

Definitions

For convenience, the meaning of some terms and phrases used in the specification, examples, and appended claims, are listed below. Unless stated otherwise or implicit from context, these terms and phrases have the meanings below. These definitions are to aid in describing embodiments and are not intended to limit the claimed invention. Unless otherwise defined, all technical and scientific terms have the same meaning as commonly understood by one of ordinary skill in the art to which this invention belongs. For any apparent discrepancy between the meaning of a term in the art and a definition provided in this specification, the meaning provided in this specification shall prevail.

Action potential has the electrophysiological art meaning of the change in electrical potential associated with the passage of an impulse across or along the membrane of a muscle cell or nerve cell. Optical imaging technologies can measure action potentials at varying spatial and temporal resolutions, including ultra-high resolution. Using voltage-sensitive dyes or genetically encoded proteins, action potentials have been optically recorded from cardiomyocytes.

Calcium transient has the electrophysiological art meaning of an increase in $Ca^{2+}$ concentration across the whole cell (not just locally) during each heartbeat.

Cardiac fibroblasts have the cell biological-art recognized meaning of a cell from the heart that produces connective tissue. Unlike the connective tissue of bone and tendon, which is organized into regular patterns of collagen, heart ECM is dense, irregular, and composed of collagens, proteoglycans, and glycoproteins. See, Ivey et al., Defining the cardiac fibroblast. Circ. J., 80(11), 2269-2276 (2016).

hCF has the cell biological-art recognized meaning of human cardiac fibroblasts.

HERG is the human ether-a-go-go-related rapidly activating delayed rectifier potassium channel that produces the rapid repolarizing potassium current $I_{Kr}$.

HERG assay is the HERG channel (the alpha subunit of a potassium ion channel) inhibition assay is a sensitive measurement which identifies compounds exhibiting cardiotoxicity related to HERG inhibition in vitro and predicts cardiotoxicity related to HERG inhibition for the compounds in vivo. Not all compounds which inhibit HERG activity in vitro will cause cardiotoxicity in vivo. The FDA maintains regulatory guidelines to screen for the most noxious compounds based on their interaction with a single potassium channel (HERG, $I_{Kr}$) (the HERG assay). The HERG assay does not identify drugs as toxic if they impact electrical activity of human cardiomyocytes in other ways that may produce arrhythmias in patients, e.g., by affecting other ion channels.

hESC has the cell biological-art recognized meaning of human embryonic stem cells.

hPSC has the cell biological-art recognized meaning of human pluripotent stem cells.

hiPSC has the cell biological-art recognized meaning of human induced pluripotent stem cells.

hiPSC-CMs has the cell biological-art recognized meaning of human induced pluripotent stem cell-derived cardiomyocytes.

hiPSC-CM$_{LP}$ has the cell biological-art recognized meaning of human induced pluripotent stem cell-derived cardiomyocytes with lactate purification.

Guidance from Materials and Methods

A person having ordinary skill in the art of cardia tissue engineering for cardiotoxicity evaluation can use these patents, patent applications, and scientific references as guidance to predictable results when making and using the invention.

Cardiomyocyte differentiation. The inventors differentiated cardiomyocytes (CMs) from human pluripotent stem cells; either human embryonic stem cells (hESCs, e.g. line RUES2) or human induced pluripotent stem cells (hiPSCs; Gibco human female episomal iPSCs from CD34+ cord blood, ThermoFisher Scientific, NCRM-5 human male episomal iPSCs from CD34+ cord blood, NIH Center for Regenerative Medicine, WTC11 GM25256 human male episomal iPSCs from dermal fibroblasts, The Gladstone Institutes, UCSF) in high-density monolayer cultures. See, Rupert & Coulombe, Stem Cells International (2017), Rupert et al., PloS One (2020a), and Rupert et al., Stem Cells International (2020b). Human pluripotent stem cells were cultured on plates coated with truncated human vitronectin (Life Technologies) in Essential 8 medium (ThermoFisher). Human induced pluripotent stem cells were harvested in 0.5 mM EDTA and 1.1 mM D-glucose in 1× phosphate-buffered saline (versene), triturated into small colonies or singularized, counted, and seeded on (1:60 dilution) Matrigel (Corning)-coated 6 or 24 well plates in E8™ with 5 µM Y-27632 (ROCK inhibitor, Fisher). Some cultures were treated with low dose 1 µM Chiron 99021 (Tocris) one day prior to initiating differentiation. Medium was changed daily until initiation of differentiation (day 0), when cells were approximately 60-90% confluent. Cells were switched to medium containing 213 µg/mL L-ascorbic acid (Sigma) and 500 µg/mL recombinant human serum albumin (ScienCell) in RPMI 1640 medium (Life Technologies) and treated sequentially with 3-9 µM Chiron, a glycogen synthase kinase 3 (GSK3) inhibitor, at day 1, followed by 5 µM inhibitor of Wnt protein 2 (IWP2; Tocris) or 2 µM WNT C-59 (Tocris) or 1 µM XAV939 (Tocris), all chemical Wnt inhibitors, at day 3. Atrial subtype was induced with exposure from days 3-12 with 0.5-1 µM retinoic acid (RA). Ventricular subtype did not contain RA. Differentiating cells were fed with basal medium on days 5 and 7, then switched to RPMI 1640 medium containing B27 supplement (with insulin; Gibco) on day 9. Some differentiating cells were pushed into the ventricular cardiac subtype and received 100 ng/mL neuregulin-1β (NRG1) daily on days 5-18 (until use in engineered tissues) and/or in engineered tissues. Some engineered tissues received 100 nM insulin-like growth factor 1 (IGF1) daily and/or 100 ng/mL NRG1 daily in engineered tissues. Cardiac phenotype, shown by beating cells, presented between days 8 and 14. Cardiomyocytes could be used at this time, but quality control evaluation of engineered tissue formation (as both microtissues and larger macro-tissues) showed reduced success in tissue formation and electromechanical function compared to cardiomyocytes undergoing lactate purification. Some experiments used unpurified cells as controls and were matched for duration of culture for experiments. Cells undergoing metabolic-based lactate purification were assessed for density and beating visually and left in the wells of the high-density monolayer cultures for lactate purification if density was high and beating was uniform across large areas of the wells. Cells not meeting these requirements for density and beating were replated at high density, $5-6 \times 10^6$ cells/cm$^2$ on Matrigel-coated 6 well plates in RPMI+B27 medium after 10-20 days of differentiation. All cells undergoing lactate purification were not fed for 4 days as a starvation period to encourage a switch in metabolism from glycolysis to oxidative phosphorylation in the cardiomyocytes, which are capable of this type of metabolism, while non-cardiomyocytes have a lower ability to switch the metabolic phenotype and therefore die, resulting in more pure populations of cardiomyocytes. Cells undergoing purification were then cultured for four days in lactate purification medium (LPM: DMEM without glucose, L-glutamine, phenol red, sodium pyruvate and sodium bicarbonate (D-5030, Sigma-Aldrich)+2-4 mM L-glutamine, 1× non-essential amino acids, 2 mM (1×) GlutaMAX™ and 4 mM lactate, pH 7.4) with the medium refreshed after 2 days. Lactate purified cells were fed with RPMI+B27 until robust beating returned or appeared. Cardiac purity is assessed by flow cytometry analysis. Cardiomyocytes differentiated from hPSCs are harvested using 0.25% trypsin in versene and used to produce engineered tissues (microtissues and larger macro-tissues) between days 14 and 25 of differentiation (without lactate purification) or are purified with the metabolic-based lactate purification protocol and used between days 18 and 30, designated CM$_{LP}$.

Cardiomyocyte differentiation (alternative). Cardiomyocytes (CMs) were differentiated from human induced pluripotent stem cells (hiPSCs; Gibco human female episomal iPSCs) in high-density monolayer cultures using CDM3 medium and Wnt signal activation and inhibition. Briefly, hiPSCs were treated with 6 µM Chiron 99,021 (Tocris), a glycogen synthase kinase 3 (GSK3) inhibitor at day 1, followed by 5 µM IWP2 (Tocris), a chemical Wnt inhibitor at day 3. Cardiac phenotype, expressed by beating cells, was visible between days 8 and 12 and upon beating, cardiomyocytes were cultured in RPMI 1640 medium with B27 supplement (RPMI+B27; Gibco). Cardiomyocytes differentiated from hiPSCs were used to produce microtissues between days 14 and 18 of differentiation or were further purified with a lactate protocol. Cardiomyocytes designated for lactate purification were harvested and replated to new culture vessels coated with Matrigel (Corning) in RPMI+B27. These cells were deprived of media change for 4 days and were fed with lactate media (DMEM without glucose, L-glutamine, phenol red, sodium pyruvate and sodium bicarbonate (D-5030, Sigma)+4 mM L-glutamine, 1×Non-Essential Amino Acids, 0-1×Glutamax and 4 mM lactate, pH 7.4). Lactate purified cells were fed with RPMI+B27+1% penicillin/streptomycin (P/S). Cardiac purity was measured by flow cytometry analysis as previously described by Rupert, Irofuala, & Coulombe, *PLoS ONE* 15, e0230001 (2020).

Flow cytometry. Cells for flow cytometry analysis were singularized and fixed in 4% paraformaldehyde (PF) for ten minutes at ambient temperature. Cells were stained with antibodies against the cardiac-specific isoform of troponin T (cTnT, 2 µg/mL; Thermo Fisher Scientific) to assess total cardiomyocyte population and/or the ventricular isoform of myosin light chain 2 (MLC2v) to assess ventricular (positive) and atrial (negative) phenotype and/or alpha-smooth muscle actin (aSMA, 0.5 µg/mL; Abcam). CTnT+ cells are considered cardiomyocytes, MLC2v+ cells are considered ventricular cardiomyocytes, MLC2v− cells are considered atrial cardiomyocytes, aSMA+ cells are considered fibroblast-like or fibroblast-precursor mesodermal stromal cells, and double-positive cTnT+/αSMA+ immature cardiomyocytes. Samples were run on either an Attune NxT or BD FACSAria Flow Cytometer and analyzed with either FlowJo or Flowing software.

Human cardiac fibroblast culture. Human cardiac fibroblasts (hCFs, from PromoCell or Sigma-Aldrich) were maintained and passaged in DMEM/F12 supplemented with 10% FBS, 1% P/S, and 4 ng/ml bFGF. Cells were passaged upon reaching near confluency in versene with 0.05% trypsin (ThermoFisher). For some studies of hCF phenotype, coverslips were coated with polyacrylamide gels at 10% acrylamide and 0.1% bis-acrylamide for a stiffness of approximately 12 kPa. Gels were functionalized with 0.2 mg/mL human Fibronectin (Sigma Aldrich) and seeded with hCFs for at least 72 hours. Human cardiac fibroblasts were incorporated into cardiac microtissues at cell passages P2-P4 or in engineered macro-tissues at cell passages P4 (young, healthy, quiescent) or P9 (aged, activated, disease-like, myofibroblast). Tissues containing hCFs demonstrate higher quality, as assessed by consistent formation, smoother edges, and improved electromechanical function (quantified by excitability, action potential waveform shape, and action potential duration) this are essential for cardiotoxicity evaluation.

Human cardiac fibroblast culture (alternative). Commercially available human ventricular cardiac fibroblasts (hCFs, Sigma) were maintained and passaged in DMEM/F12 supplemented with 10% fetal bovine serum (FBS), 1% penicillin/streptomycin (P/S), and 4 ng/ml basic fibroblast growth factor (Reprocell). hCFs were incorporated into cardiac microtissues at cell passages P2-P4.

Fabrication of microtissue mold hydrogels and 3D microtissue culture. Scaffold-free three-dimensional microtissues (spheroid in shape, also called spheroids and/or organoids) are generated using non-adhesive agarose gels with cylindrical microwells with hemispherical bottoms to guide self-assembly. Sterilized 2% (wt/vol) agarose is pipetted into molds designed for 24-well plates with 800-µm-diameter rounded pegs (Microtissues, Providence, RI, USA). After being cooled to room temperature (~5 minutes), the agarose gels are separated from the molds and transferred to single wells of 24-well plates. For equilibration, 1 mL medium is added to each well. Hydrogels are equilibrated at least one hour or overnight at 37° C. in a humidified incubator with 5% $CO_2$. Molds are transferred to 6-well plates for electrical stimulation, and hiPSC-CM or hiPSC-$CM_{LP}$ with or without additional human cardiac fibroblasts (5-15%) in suspension are added to the center of the hydrogel seeding chamber (100-900K cells/mold in 35 recesses, depending on output being assessed; typically, 600-800K for optical mapping) and allowed to settle into the recesses for 30 minutes. Medium is then added to each well (5 ml), and cells are cultured for 6-8 days with electrical field stimulation with a 1 Hz, 10.0 V, 4.0 milliseconds duration bipolar pulse train for the full three-dimensional culture period (C-Pace EP, IonOptix).

Image acquisition and processing. Phase-contrast images of cells and microtissues were captured with a Nikon TE2000-U and a black and white/color digital camera (MicroVideo Instruments, Avon, MA, USA) and acquired and analyzed with NIS Elements software.

Microtissue size analysis. Stitched 4× phase-contrast images of whole 35-well microtissue hydrogels were acquired and analyzed. Image thresholding and particle size analysis was used in NIS Elements to determine the top view cross-sectional area of individual microtissues across each mold.

Microtissue size analysis (alternative). Stitched 4×phase-contrast images of whole 24-well microtissue hydrogels were captured with a Nikon TE2000-U and a black and white/color digital camera (MicroVideo Instruments, Avon, MA). NIS Elements software was used for image acquisition and analysis. Image thresholding and particle size analysis was performed to determine the top view cross-sectional area of individual microtissues across each mold.

3D tissue sections and immunohistochemistry. The inventors fixed microtissues in 35-well hydrogels using 4% (vol/vol) paraformaldehyde (Electron Microscopy Sciences, Hatfield, PA, USA) and 8% (wt/vol) sucrose in phosphate-buffered saline (PBS) overnight at room temperature. Molds were then rinsed twice with phosphate-buffered saline and equilibrated, as indicated by their sinking, usually over twelve hours, with 15% and then 30% (wt/vol) sucrose in phosphate-buffered saline. Whole agarose gels containing microtissues were removed from sucrose, blotted dry, and embedded in Tissue-Tek CRYO-OCT Compound (Ted Pella, Redding, CA, USA). Blocks were stored at −80° C., sectioned on a Leica CM3050 cryostat microtome (Leica Biosystems, Buffalo Grove, IL, USA) into 10 µm-thick sections, and placed on Superfrost Plus slides. After being air dried for fifteen minutes, sections were postfixed in 4% paraformaldehyde in phosphate-buffered saline. For immunofluorescent staining at room temperature, frozen sections were rinsed three times for five minutes with 1× phosphate-buffered saline wash buffer. Non-specific binding was blocked with 1.5% goat serum for one hour, followed by one-hour incubations in primary and secondary antibodies diluted in 1.5% goat serum. Primary antibodies were directed against cardiac troponin I (cTnI, 1:100, Abcam ab47003) and vimentin (1:100, Sigma-Aldrich (St. Louis, Mo., USA) V6630), and secondary antibodies were conjugated to Alexa Fluor 488 or Alexa Fluor 594 (1:200, Invitrogen). Coverslips were mounted with Vectashield™ mounting medium with DAPI. Images were taken with an Olympus FV3000 Confocal Microscope and processed using ImageJ.

3D tissue sections and immunohistochemistry (alternative). Microtissues in 24-well hydrogels were fixed with 4% (vol/vol) paraformaldehyde (Electron Microscopy Sciences, Hatfield, PA) and 8% (wt/vol) sucrose in phosphate-buffered saline overnight at room temperature. Molds were then rinsed twice with phosphate-buffered saline and fully equilibrated (as indicated by their sinking, usually over twelve hours) with 15% and then 30% (wt/vol) sucrose in phosphate-buffered saline. Whole agarose gels containing microtissues were removed from sucrose solution, blotted dry, and embedded in Tissue-Tek CRYO-OCT Compound (Sakura). Blocks were stored at −80° C., sectioned on a Leica CM3050 cryostat microtome (Leica Biosystems, Buffalo Grove, IL, USA) into 10-μm-thick sections, and placed on Superfrost Plus slides. After being air dried for 15 min, sections were post-fixed in 4% paraformaldehyde in phosphate-buffered saline. For immunofluorescent staining at room temperature, frozen sections were rinsed 3 times for 5 min with 1×phosphate-buffered saline wash buffer. Non-specific binding was blocked with 1.5% goat serum for 1 hour, followed by 24 hours incubation in primary and followed by a one-hour incubation in secondary antibodies diluted in 1.5% goat serum. Primary antibodies were directed against cardiac troponin I (cTnI, 1:100, Abcam ab47003) and vimentin (1:100, Sigma V6630), and secondary antibodies were conjugated to Alexa Fluor 488 or Alexa Fluor 594 (1:200, Invitrogen). Coverslips were mounted with Vectashield mounting medium with DAPI. Images were taken with an Olympus FV3000 Confocal Microscope and processed using ImageJ.

Optical signals. The optical signals of cardiomyocyte excitation are simple and compatible with rapid analysis. The source of the optical signal varies. Fluorescing dyes can detect voltage and calcium. These two signals have physiological relevance, as voltage is the measure of the action potential, and the action potential triggers intracellular calcium to rise, so the intracellular calcium concentration gives a measure of the calcium transient (CaT). Alternative dyes with longer wavelength are being developed, which could be used in the invention, and some genetically encoded voltage- and calcium-responsive fluorescent proteins are available if human induced pluripotent stem cell lines are engineered to express these reporters, which itself involves an investment of labor and resources. Following the action potential and calcium transient in cardiomyocytes is a physical muscle contraction, and this signal can be detected optically through movement of the cells, tissue, or posts where the tissue is attached. The Biowire platform now being commercially developed by Tara Biosciences, uses fluorescent wires through the ends of three-dimensional tissues so the contraction can be extracted through optical detection of wire deflection. However, a contractile signal for arrhythmia detection is two steps removed from the source of the signal (which is the action potential) and like in the game of "telephone" the smoothing and distortion of the signal can complicate the data interpretation for arrhythmias. For all these signals, the spatial and temporal resolution of these signals varies based on the equipment used, and this resolution impacts the precision of the measurements and their interpretation. Because arrhythmias are triggered primarily by changes in the action potential and less often by changes in the calcium transient or contraction, the precision of the metrics are of paramount importance for assessing arrhythmic cardiotoxicity.

Optical mapping and automated action potential duration analysis. The inventors used an Olympus MVX10 microscope to image 1.2×1.2-mm² regions. Microtissues were loaded with voltage-sensitive di-4-ANEPPS (5 μM for ten minutes at 35° C.) for measurements of membrane potential ($V_m$). The inventors acquired and analyzed fluorescence images at 979 frames/s using a Photometrics Evolve+128 EMCCD camera (2×2 binning to 64×64 pixels, 18.7×18.7-μm² resolution, 1.2×1.2-mm² field of view) and an Olympus MXV10 macroview optical system. Fluorescence images were filtered using nonlinear bilateral filter (spatial filter: 5×5 window, temporal filter: 21-point window) to preserve action potential upstrokes from blurring. Typically, four microtissues were recorded simultaneously/scan at this magnification. A single microtissue is typically covered by ~60 pixels at this magnification. The pixels with action potentials were identified from Fast Fourier transformation (FFT) of fluorescence signals. After appropriate thresholding and image segmentation, the region of each microtissue was grouped and the fluorescence signals from the pixels in the same microtissue were average and used for action potential analysis.

Optical mapping and automated action potential analysis (alternative). Microtissues were loaded with voltage-sensitive di-4-ANEPPS (5 μM for 10 min at 35° C.) for measurements of membrane potential ($V_m$). Fluorescence images were acquired at 979 frames/s using a Photometrics Evolve+128 EMCCD camera (2×2 binning to 64×64 pixels, 18.7×18.7-μm² resolution, 1.2×1.2-mm² field of view) and an Olympus MXV10 macroview optical system. See Kim et al. PLoS ONE 13, e0196714 (2018). Typically, four microtissues were recorded simultaneously per scan at this magnification. A step-by-step illustration of automated data analysis is available in FIGS. 4A-G. Briefly, the pixels with APs were identified from Fast Fourier transformation (FFT) of fluorescence signals. After appropriate thresholding and image segmentation, the region of each microtissue was grouped and the fluorescence signals from the pixels in the same microtissue were average and used for action potential analysis. See FIGS. 4A-G Validation and screening of toxicants for arrhythmogenic risk. Microtissues were acutely exposed to increasing concentrations of E4031 (a high-risk HERG channel blocker; 0-2 μM), ranolazine (a low-risk sodium channel and HERG blocker, 1-100 μM), and bisphenol-A (at 1-1000 nM) with 20-minute incubation periods followed by approximately 3-minute imaging periods. Concentrations are selected to span human exposure levels or blood serum levels and quantify dose-dependent changes over a wide range (with a goal of more than 10,000× change in concentration and at least 4-6 doses). A single mold of microtissues is imaged for approximately 1 hour to assure quality recordings without signal degradation due to tissue degeneration, enabling measurement under control conditions (zero compound) and 3 doses. Small changes are quantified by action potential metrics and discrimination between compounds targeting HERG channel (E4031 and ranolazine) is demonstrated.

Figure 5:
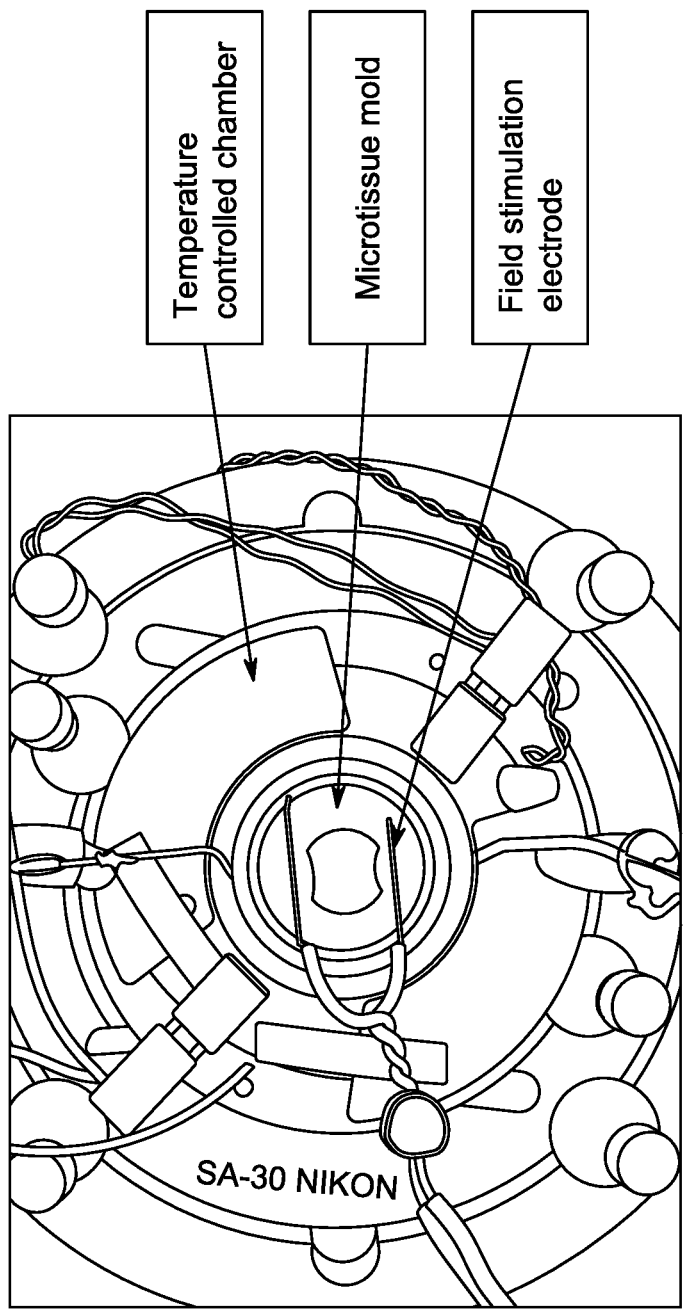
FIG. 5 is an image of a stimulation electrode set-up during optical mapping image acquisition.
Figure 6A:
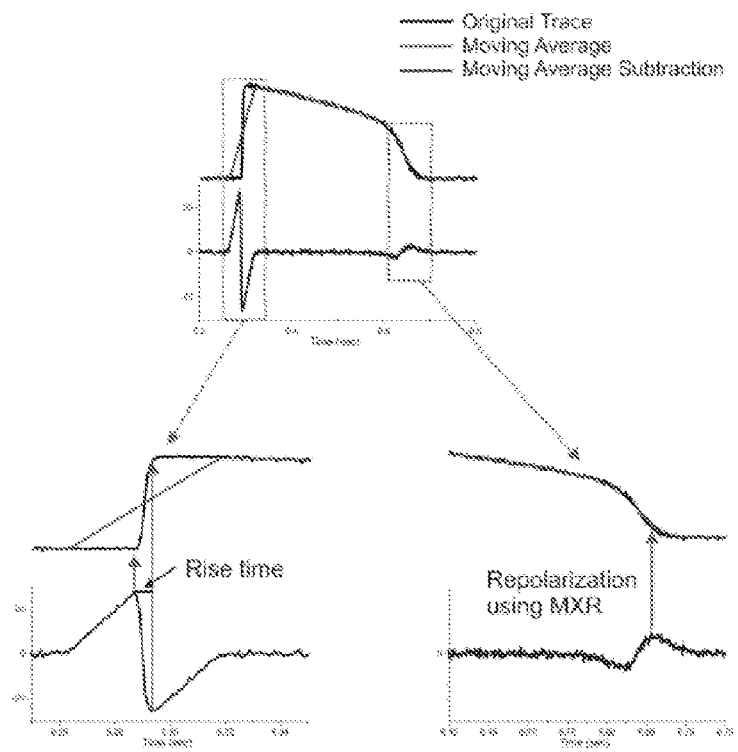
FIGS. 6A-B show a method of detecting the rise time of action potential upstroke and repolarization (MXR) using the moving average subtraction algorithm.
Figure 6B:
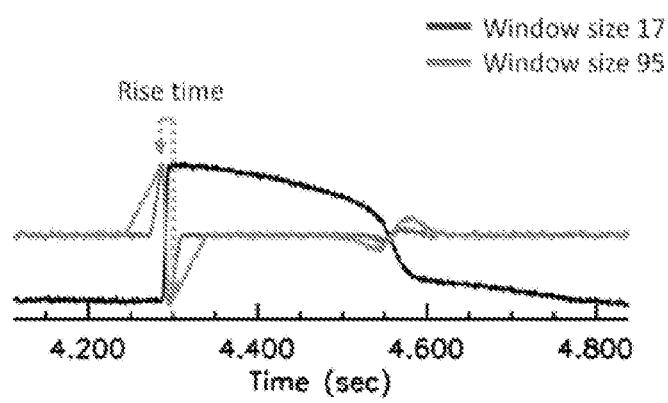

Validation and screening of toxicants for arrhythmogenic risk (alternative). A single mold of microtissues was mounted on a temperature-controlled chamber (Dual Automatic Temperature Controller TC-344B, Warner Instrument) to maintain 35±1° C. and bathed with Tyrode's solution containing (in mM) 140 NaCl, 5.1 KCl, 1 $MgCl_2$, 1 $CaCl_2$, 0.33 $NaH_2PO_4$, 5 HEPES, and 7.5 glucose. Microtissues were stimulated with a platinum field stimulation electrode. See FIG. 5. Myopacer EP field stimulator, IonOptix, Milton, MA, USA). The test compounds including E4031, 4-AP, BayK8644, ISO were purchased from Sigma Aldrich and dissolved in 100% DMSO to prepare 0.01-0.5 mM stock solutions. BPA was dissolved in 10% ethanol stock solution and diluted in Tyrode solution to the final concentration. Microtissues were exposed to vehicle (DMSO or ethanol) and the indicated concentrations of test compounds for 20 min, and action potentials were measured as described above.

Quantitative RT-PCR. MRNA was extracted from cells (CMs or hCFs) and engineered tissues using the RNeasy Mini Kit and mRNA concentration was measured with a NanoDrop 1000 Spectrophotometer. The cDNA was synthesized from a normalized mass of mRNA for cells and tissues separately using the SuperScript III First-Strand Synthesis System. CDNA samples were combined with custom primers: ACTA2a (α-smooth muscle actin) Forward: CCGACCGAATGCAGAAGGA (SEQ ID NO: 1), Reverse: ACAGAGTATTTGCGCTCCGAA (SEQ ID NO: 2). GJA1 (connexin 43) Forward: CTTTTGGAGTGACCAGCAAC (SEQ ID NO: 3), Reverse: TGAAGCTGAA-CATGACCGTA (SEQ ID NO: 4) and SYBR Master Mix, and quantitative real-time PCR was run on an Applied Biosystems® 7900 fast real-time system. HPRT was an internal control for normalization and relative expression was calculated using the 2^(-ΔΔCt) method. Livak & Schmittgen, Methods, 25(4), 402-408 (2001).

Macro-tissue mold and tissue formation. Molds for larger macro-sized engineered tissues with mm to cm dimensions and tissues formed in them are created as previously described (see Munarin et al. 2017 and Kaiser et al. 2019). In brief, custom acrylic molds were fabricated by laser etching/cutting using a 100W $CO_2$ laser and polydimethylsiloxane (PDMS) was poured into acrylic negatives and cured at 60° C. PDMS molds were sterilized by autoclaving. Tissues are form by combining $1 \times 10^6$ hiPSC-CMs and 0-15% hCFs with 1.6-3.2 mg/mL rat tail collagen-1 at a 50%/50% vol/vol ratio for a final concentration of approximately $16 \times 10^6$ hiPSC-CMs/mL and 0.8, 1.25, or 1.6 mg collagen/mL. Cell-collagen solution was pipetted into PDMS molds, maintained in RPMI/B27, and stimulated with a 4-millisecond biphasic pulse at 1 Hz and 5 V/cm for the duration of culture.

Mechanical testing. Mechanical measurements were performed after one or two weeks of culture as previously described. Engineered tissues were cut in half and their passive and active mechanical properties were measured with an ASI 1600A system. Aurora Scientific, Ontario, Canada. Strips were mounted on hooks attached to a 5 mN force transducer and high-speed motor arm, bathed in Tyrode's solution with 5 mM glucose and 1.8 mM $CaCl_2$ at 30-34° C., and electrically field stimulated with platinum electrodes. Tissues were stretched from their initial length, $L_0$ (determined as just above slack length), by 5% steps to 130% $L_0$. At the final length, tissues were paced with increasing frequency, and the fastest pacing they followed was recorded as the maximum capture rate (MCR).

Calculations were made from the data recorded during mechanical testing to obtain these values: Active stress, $\sigma_a$, was calculated by averaging the active twitch force of ten contractions and normalizing by the cross-sectional area (CSA). The was calculated under the assumptions that tissue height was half the width and cross-sectional shape was an ellipse. Fold change was calculated from the ratio of the maximum active stress at 130% $L_0$ to active stress at the initial length $L_0$. Passive stress, $\sigma_p$, was calculated by normalizing the passive (baseline) force produced at each step by the cross-sectional area, and tissue stiffness (Young's modulus) was calculated as the slope of the line of best fit of passive stress versus strain at 5-30% strain.

Fabrication of hydrogels and 3D culture. Scaffold-free 3D spherical microtissues were generated using non-adhesive agarose gels with cylindrical microwells with hemispherical bottoms to guide self-assembly. Sterilized 2% (wt/vol) agarose was pipetted into molds designed for 24-well plates with 800-μm-diameter rounded pegs (3D Petri Dish, MicroTissues). After being cooled to room temperature (~5 min), the agarose gels were separated from the molds and transferred to single wells of 24-well plates. For equilibration, 1 mL RPMI+B27+1% P/S medium was added to each well. Hydrogels were equilibrated for at least 1 hour at 37° C. in a humidified incubator with 5% $CO_2$. Molds were transferred to 6-well plates for electrical stimulation, and hiPSC-CMs with or without additional 5% hCFs in suspension were added to the center of the hydrogel seeding chamber (420-840 K cells/mold in 35 recesses) and allowed to settle into the recesses for 30 min. Medium (RPMI+B27 with 1% P/S and 10% FBS with 5 μM rock inhibitor (Y27632)) was then added to each well (5 mL). Medium was changed to RPMI+B27 with 1% P/S and 10% FBS at 24-48 hours, and cells were cultured for 6-8 days with media changes every other day. During the 3D culture period, the self-assembled microtissues were field stimulated with a 1 Hz, 10.0 V, 4.0 milliseconds duration bipolar pulse train with an Ionoptix C-Pace EP. To study hCF interspersion within tissues, hCF were incubated for 30 min in CellTracker Orange™ working solution and hiPSC-CM were incubated for 30 min in CellTracker Green™ working solution before seeding in 3D hydrogels. Spheroids were recovered from hydromolds and transferred to glass bottom dishes. Images were taken with an Olympus FV3000™ confocal microscope and processed using ImageJ.

Statistical Analysis. Statistical analyses of the obtained data were performed using paired or two-tailed unequal variance Student's t tests, one-way ANOVA with Tukey's multiple comparisons tests, two-way ANOVA with Tukey's multiple comparisons tests, linear regression, and non-linear regression. Paired comparisons within each microtissue with multiple acute chemical exposures reduces variance, which reduces the required number of microtissues to reach statistical significance, thus increasing throughput. Power analysis was used to evaluate sample size.

Mean and standard deviation or standard error of the mean were plotted using Graphpad Prism™.

The data from optical mapping are expressed as mean±standard deviation for n microtissues unless otherwise indicated. Statistical analyses were performed using Student's two tailed paired and unpaired t-test. P values of 0.05 were considered statistically significant. Normality test was done using Kolmogorov-Smirnov test. The test for the equality of regression coefficients was done using Z statistics of two slopes and standard error. P values of 0.05 were considered statistically significant. Normality test was done using Kolmogorov-Smirnov test. The test for the equality of regression coefficients was done using Z statistics of two slopes and SE as described by Cohen et al., Applied Multiple Regression/Correlation Analysis for the Behavioral Sciences 3rd edn. (Lawrence Erlbaum Associates, Mahwah, 2003) and Paternoster et al., Criminology 36(4), 859-866 (1998).

Model

The Cardiac Tissue-Engineered Model (TEEM) uses human cardiomyocytes derived from human pluripotent stem cells, which express all the human proteins, ion channels and currents necessary for assessing a human-specific arrhythmic and cardiotoxic response, including the seven critical ion channels identified by the FDA's CiPA initiative. The inventors use state-of-the-art hiPSC-CM differentiation and purification techniques to have a renewable source of human cardiomyocytes, and the inventors add primary adult human cardiac fibroblasts (5% of total cell number; see Rupert et al., Stem Cells International (2020b); cell source is ThermoFisher Scientific, Waltham, MA, USA or Promo-Cell, Heidelberg, Germany) to form miniaturized human heart tissue in microwells that promote aggregation of cells into 3-dimensional tissues. After one week of 3D microtissue culture, the inventors perform cardiotoxicity screening on arrays of 35 microtissues/mold with automated signal detection and analysis to have high sample number (35 microtissues/dose) and throughput (4 doses/hour) in this acute drug screening model. A video recording taken during a procedure called optical mapping provides high temporal resolution (1.0 milliseconds/frame=979 fps) of the fluorescence signal elicited by a voltage-sensitive dye (di-4-ANEPPS). The intensity of the signal gives a reading of voltage (in the millivolt range) overtime, which is the action potential trace. A similar dye that fluoresces in response to the intracellular calcium ($Ca^{2+}$) concentration gives a calcium transient (CaT) for each activation of each cardiac microtissue. See above. From these waveforms, the inventors extract quantitative metrics that accurately reflect the speed and amplitude of the action potentials of the cardiomyocytes, due to the high temporal resolution of the recordings.

These metrics provide integrated data on how the compound impacts electrical activation through changing the action potential or calcium handling. See TABLE 1 for the metrics used to assess the action potential and underlying physiological targets (i.e., ion channels and currents).

TABLE 1

Quantitative metrics and psyiological targets of the AP.

| Metric (units) | Ion channels involved | Ion currents |
| --- | --- | --- |
| Excitability (%) and stimulation time delay | Na channels ($Na_v$1.5, 1.1, others) Inward rectifier $K^+$ channel (Kir2.1) | $I_{Na}$ $I_{K1}$ |
| Rise time (ms) | Na channel ($Na_v$1.5) | $I_{Na}$ |
| APD30 (ms) | Late Na channels ($Na_v$1.1, others) Ca channels ($Ca_v$1.2) K channels (Kv4.2/4.3, Kv1.4) | $I_{Na,\,late}$ $I_{CaL}$ $I_{tc}$ |
| APD60 (ms) | Late Na channels ($Na_v$1.1, others) Ca channels ($Ca_v$1.2) K channels (hERG, KvLQT, Kv4.2/4.3, Kv1.4) | $I_{Na,\,late}$ $I_{CaL}$ $I_{tc}$, $I_{Kr}$, $I_{Ks}$ |
| APD80 (ms) | K channels (hERG, KvLQT, Kir2.1) | $I_{Kr}$, $I_{Ks}$, $I_{K1}$ |
| $APD_{tri}$ (ms) = APD80 − APD30 | Late Na channels (Nav1.1, others) Ca channels ($Ca_v$1.2) K channels (hERG, KvLQT, Kv4.2/4.3, Kv1.4, Kir2.1) | $I_{Na,\,late}$ $I_{CaL}$ $I_{tc}$, $I_{Kr}$, $I_{Ks}$, $I_{K1}$ |
| EADs (count/AP) | K channels (hERG, KvLQT) Late Na channel (Nav1.5) | $I_{Kr}$, $I_{Ks}$ $I_{Na,\,late}$ |

The inventors have validated this model using compounds with known ion channel targets and effects on cardiac electrophysiology that modulate specific ion currents involved in generating the action potential. Induction of the fight-or-flight response by beta-adrenergic stimulation with isoproterenol has been shown to increase $I_{CaL}$ and $I_{Ks}$. Isoproterenol (100 nM) reduces $APD_{80}$ by an average 45 milliseconds as expected without evoking early afterdepolarizations (EADs). The calcium channel agonist BayK8644 (300 nM) prolongs $APD_{80}$ by 34 milliseconds. The inventors also tested E4031, which blocks the HERG channel that generates the rapid repolarizing potassium current $I_{Kr}$, as a critical validation step to assess the ability of the invention to predict action potential duration increase and early afterdepolarization formation that would correlate with increased QTc in patients under HERG blockade. The inventors observed a concentration-dependent increase in $APD_{80}$ with E4031 and induction of early afterdepolarizations either when a stress condition is stimulated by isoproterenol addition in hiPSC-CM microtissues or without additional isoproterenol in hiPSC-$CM_{LP}$ microtissues. All three compounds produced electrophysiological results that matched the inventors' predicted changes in action potential waveform, strengthening the qualification of the invention for predicting cardiotoxicity.

To test the predictive capacity of the Cardiac TEEM platform, the inventors evaluated a clinical anti-arrhythmic therapeutic, ranolazine, which blocks multiple ion channels with varying sensitivity including HERG channel. Ranolazine is classified by the FDA CiPA program as a low-risk compound that blocks the HERG channel ($I_{Kr}$; $IC_{50}$=11.5 µM). The inventors found that action potential duration prolongation in the invention appears only at the concentration above 10 µM that was tested (100 µM). Ranolazine has promiscuous binding that also blocks late sodium current ($I_{Na,late}$; $IC_{50}$=5.9 µM), late $I_{Ca}$ ($IC_{50}$=50 µM), $I_{NCX}$ ($IC_{50}$=91 µM), and peak $I_{Ca}$ ($IC_{50}$=296 µM). The sum of these changes minimally alters the action potential at low concentrations (2-10 µM). As a result, drug-induced arrhythmias are minimal with appropriate ranolazine dosing in patients. FDA documentation states that "at a dose of 1000 mg b.i.d., the mean steady-state $C_{max}$ [in blood serum] was 2569 ng/mL [6.0 µM]; 95% of $C_{max}$ values were between 420 and 6080 ng/mL [0.98 and 14.2 µM]".

The inventors' assessment shows nuances in the response to ranolazine at low concentrations (at which stimulation delay, rise time, and action potential duration are altered) versus the response at a high concentration (100 µM) at which the major concern is increased action potential duration. This quantitative assessment enables predictive in vitro to in vivo extrapolation (IVIVE) to identify safe exposure levels of industrial chemical and environmental toxicants and to select drugs more accurately for further pharmaceutical development with true clinical benefits and to predict their safe concentrations.

Method for Testing Compounds

The invention is useful for testing compounds with unknown targets and have not been screened against binding individual ion channels. To assess the utility of the invention using a compound with less well-known effects on the AP, the inventors tested bisphenol-A (BPA), an endocrine-disrupting chemical due to its structural similarities to the hormone estrogen. Bisphenol-A is found in plastics, food products, and the environment.

In a Cardiac TEEM platform containing female hiPSC-CMs, bisphenol-A (BPA) shifts action potential duration measurements at one nM concentration and has a quantitative response profile clearly different from ranolazine. At low concentrations, BPA increased stimulation delay and slowed action potential rise time. This result suggests an effect on $I_{Na}$. Further, the inventors observed that the $APD_{30}$ and $APD_{50}$ were shortened more than $APD_{80}$, which suggests that BPA alters the plateau phase. The "$APD_{tri}$" metric, calculated as $APD_{80}$-$APD_{30}$, indicates triangulation of the action potential signal. When $APD_{tri}$ is shorter, as with BPA treatment, it suggests there are reduced currents in the plateau phase, primarily $I_{Ca}$ and $I_{Na,late}$. This metric helps distinguish altered action potential duration due to sodium and calcium currents earlier in the action potential versus later repolarization due to potassium currents $I_{Kr}$, $I_{Ks}$, and $I_{K1}$. BPA is reported to block sodium channel Nav1.5 with an $IC_{50}$ of 25 μM. Studies in rodents suggest BPA alters excitability and $Ca^{2+}$ handling, promoting arrhythmias at 1 nM with greater sensitivity in female rats compared with male rats that increased with isoproterenol stimulation. Thus, these results follow our data and may provide a predictive human model for assessing BPA cardiotoxicity in people. In summary, these data show that the novel Cardiac TEEM can detect changes in action potential waveform with high resolution and can implicate which ion currents are altered by drug exposure. Evaluation of FDA CiPA list compounds, industrial chemicals, and environmental toxicants validates the specificity (true positive rate), sensitivity (true negative rate), and broader utility of the Cardiac TEEM platform. Further, this type of comprehensive testing generates a database for comparing responses of test compounds with unknown effects to those the inventors understand well in terms of their mechanism of action and human clinical safety.

The major advantage of the Cardiac TEEM platform is the integrated signals arising from multiple ion channels and currents in the human cardiomyocytes that is critically needed for predicting a human-specific arrhythmia response at the tissue level. The integrated ion current response that is present in the measured waveforms, combined with the simplicity of the engineered tissues and automated analysis, fills a need that is not yet addressed by current cardiotoxicity assays (both in vitro and in animal studies) or other proposed approaches that require highly specialized assays (often operated by trained experts), such as patch clamping and in silico modeling being pursued by the FDA CiPA initiative or the carefully engineered Biowire platform being pursued by TARA Biosciences. The inventors propose that novel compounds be evaluated in the Cardiac TEEM platform during the early discovery phase of pharmaceutical development as a mid-stage to late-stage in vitro assessment of compounds on cardiac function. This means that hundreds of compounds would be screened at this stage for arrhythmogenic, and other types of cardiotoxicities and the data could stratify compounds for continued development, reformulation of compounds performing well in other screenings (e.g., efficacy), and used to predict human in vivo responses. Further, the inventors propose that industrial chemicals and environmental toxicants be evaluated in the Cardiac TEEM platform routinely, as cardiac effects of chemicals are not routinely used for evaluating safe exposure levels, yet the World Health Organization reports elevated levels of cardiovascular disease may be due to environmental toxicants such as herbicides/pesticides, plastics/plasticizers, flame retardants, pollution, and other sources.

The advantages of the Cardiac TEEM platform include: (1) use of multiple cell types (hPSC-CM, hPSC-$CM_{LP}$ and human cardiac fibroblasts) in appropriate ratios for stable electrophysiological responses; (2) high temporal resolution to enable multiple accurate quantitative metrics; (3) simple self-assembly of three-dimensional microtissues using few cells in bio-compatible agarose microwells; (4) automation of data acquisition and analysis; and (5) physiologically relevant metrics that aid in identification of the targeted ion channels for feedback in the model system to enable compound re-design to reduce toxicity.

The design of the invention enables broad adoption. Forming the engineered tissues is simple with the 3D Petri Dish (Microtissues, Inc.) because the microwells are made from molding templates in agarose (a polysaccharide) in standard cell culture plates compatible with stimulation electrodes for long-term electrical pacing during tissue culture. The inventors have reduced the number of cells required/microtissue, thus maximizing the number of microtissues for testing. The inventors automated aspects of data acquisition and analysis. Further, the inventors are developing a database of results for comparing novel compounds to known compounds and predicting mechanisms of toxicity.

Methods and standards for assessinq cardiotoxicity. The Comprehensive In vitro Proarrhythmia Assay (CiPA) initiative has identified necessary goals for advancing cardiotoxicity testing, including the use of cardiomyocytes derived from human induced pluripotent stem cells (hiPSC-CMs) and evaluation of seven key species-specific ionic currents that control the cardiac action potential (AP) and may affect the development of cardiac arrhythmias. This approach mainly focuses on cellular arrhythmia mechanisms such as early afterdepolarizations (EAD) or delayed afterdepolarizations (DAD) but does not cover a whole spectrum of arrhythmia mechanisms. Arrhythmias develop from two synergistic conditions, trigger (ectopic heartbeat including earlier afterdepolarizations and delayed afterdepolarizations) and substrate for reentry (tissue heterogeneity, dispersion of repolarization). Drug toxicity can be much more severe in certain populations of human due to genetic predisposition or in pathological conditions such as infarcted or failing hearts, termed 'hidden cardiotoxicity.'

The current standards for cardiotoxicity testing have raised significant concerns and the FDA has set forth a set of guidelines for how cardiotoxicity testing could be done through their CiPA initiative. The Cardiac TEEM platform is more efficient and predictive, which differentiates the invention from the competition. Thus, the inventors propose to use the Cardiac TEEM platform with no prior patch clamp evaluation of single ion channel interactions or in silico modeling. TABLE 2 shows comparisons with other in vitro human cardiotoxicity testing technologies.

TABLE 2

Comparison with other technologies for cardiotoxicity testing

| Platform or Company | Culture Format | Readouts | Resolution | Targeted Outcomes |
|---|---|---|---|---|
| Cardiac TEEM | 3D microtissues; 95% CM + 5% CF: 1 week culture | Paced (0.5-4 Hz) for fluorescence recording of $V_m$ (VSD) and Ca (CSD) | 965 fps (both VSD & CSD) | AP and CaT for assessing arrhythmia risk and multiple mechanisms of arrhythmia induction |
| Tara Biosciences (32, 34) | 3D "Biowire" tissues: 91% CM + 9% CF: 6 wks culture | Paced (1 Hz) for CSD and optical contraction (signal from deflection) | 100 fps | CaT for assessing Ca handling related to arrhythmia & HF; contraction for HF assessment |

TABLE 2-continued

Comparison with other technologies for cardiotoxicity testing

| Platform or Company | Culture Format | Readouts | Resolution | Targeted Outcomes |
|---|---|---|---|---|
| InSphero (36) | 3D microtissues; 80% CM + 20% CF; 3-4 weeks culture | Spontaneous beating for optical contraction; patch clamp for $V_m$; RNA; imaging | 240 fps contraction | AP($V_{m,\ max}$, APD; max upstroke velocity) for arrhythmia assessment; contraction |
| Cyprotex (38) | 3D microtissues; CM + CF + andothelial cells; culture time not reported | Spontaneous beating for confocal high content screening; 72 h exposure | Single time point data collection | Structural cardiotoxicity (DNA structure, Ca homeostasis, cellular ATP content, mitochondrial mass & $V_m$) |
| FDA CiPA platform (37) (Strauss & Stockbridge) | 2D CMs; time not reported | Spontaneous beating for VSD and MEA | Not reported | AP (beating rate, APD90, EADs) and field potential for arrhythmia |
| ACEA Biosciences, Inc. (29) | 2D CMs; 8-12 d culture | Spontaneous beating for MEA | Not reported | Field potential for arrhythmia (acute & 24 hr) |
| Nicardia (30) | 2D CMs; time not reported | Spontaneous beating for MEA | Not reported | Field potential for arrhythmia |

Note that all other technologies use a higher % human cardiac fibroblasts.

Regulatory path. Evaluation of compounds with known mechanisms of action and/or human safety data can provide in vitro experimental data for comparing the current risk stratification (no/low, moderate, and high arrhythmic risk) and currently recommended patient dosing regimens to quantitative, dose-dependent parameters from the Cardiac TEEM platform. Known mechanisms of actions and drug labels of these compounds are used to assess the assay's sensitivity and specificity for predicting affected ion channels/currents and risk of clinical arrhythmia (e.g., Torsades de Pointes arrhythmia). The following outlines a project plan that prioritizes compounds that differentiate this model from other hiPSC-CM assays and test compounds across risk levels.

Guidelines S7B and E14 from the International Conference on Harmonisation of Technical Requirements for Registration of Pharmaceuticals for Human Use (ICH) currently govern the cardiac safety landscape for new drugs and focus on ventricular repolarization via $I_{Kr}$ (hERG channel) and clinical QTc prolongation, respectively.

The FDA CiPA initiative is a collaboration between the Center for Drug Evaluation and Research (CDER) and the Center for Devices and Radiological Health (CDRH). These two centers and the Center for Biologics Evaluation and Research (CBER), that formulated Guideline S7B with CDER, are likely the groups to regulate this invention.

Because patient ECG data must be collected in Phase I clinical trials and novel ECG metrics for assessing arrhythmogenicity are already being defined and evaluated by CiPA, the screening data can readily be compared to these clinical data sets to assess predictive power of the Cardiac TEEM platform.

The EPA's ToxCast and Tox21 programs and the National Toxicology Program (NTP) do not routinely screen for cardiotoxicity despite NTP research programs striving to do cardiotoxicity testing with 2D assays and despite the global need for cardiac safety from environmental toxicants. Regulatory-facing bodies such as the Health and Environmental Sciences Institute (HESI) and collaborations such as the Interagency Coordinating Committee on the Validation of Alternative Methods (ICCVAM) are encouraging adoption of predictive models, and this invention is appropriate for these applications for testing chemicals, e.g., industrial, agricultural, and environmental compounds and toxicants.

The following EXAMPLES are provided to illustrate the invention and should not be considered to limit its scope.

Example 1

Metric Innovations

The inventors developed improved analyses for extracting quantitative metrics of a voltage signal (the action potential, AP) and a calcium signal (calcium transient, CaT) of cardiomyocytes. Metrics can be used for gaining a deeper understanding of the biology underlying the action potential for purposes such as toxicity evaluation. Fast Fourier transform (FFT) was used to automatically distinguish responsive microtissues from non-responsive microtissues lacking APs. Microtissues without APs are automatically removed based on peak FFT ($FFT_{max}$). Automated thresholding uses Otsu's thresholding or cross entropy segmentation. Blob coloring algorithm detects individual microtissues. Fluorescence signals within the same microtissue are averaged to acquire high signal-to-noise ratio and increase fidelity of data analysis. Automated analysis uses the first derivative (dF/dt) for detecting action potential upstroke to calculate duration to 30, 50, 80, 90% recovery ($APD_{30/50/80/90}$) or uses the maximum peak of the second derivative ($d^2F/dt^2$) that identifies the peaks in acceleration of the signal for assessing the end of maximum repolarization rate (MxR) to calculate action potential duration "$APD_{MxR}$". See Efimov et al., Circulation (1994).

Figures 3A, 3B, 3C:
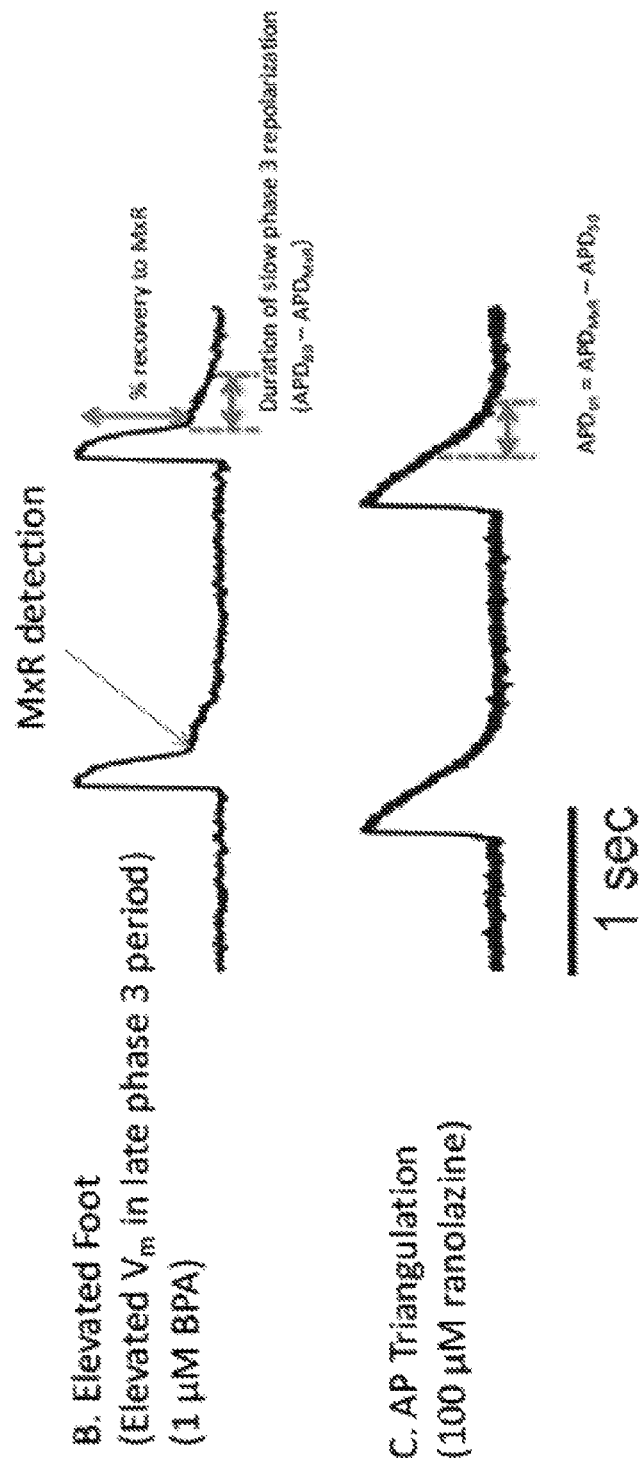
FIGS. 3A-C are a set of charts showing action potential shape examples.

The metric being described here is in the action potential. Alterations in late repolarization are evaluated by identifying the end of the rapid or maximum repolarization rate (MxR). In traces where this does not coincide with the stable baseline of the action potential, a "foot" is created where there is a duration of elevated membrane potential that slowly returns to the baseline voltage level. The appearance of the "foot," slowed repolarization to the baseline of resting membrane potential, is an indication of high risk to late-phase 3 early afterdepolarization. Burashnikov & Antzelevitch, Pacing Clin. Electrophysiol, (2007). The late phase 3 early afterdepolarization is an extrasystole that occurs during the late phase of action potential and has an elevated risk to propagate and form reentry, leading to tachyarrhythmias. Burashnikov & Antzelevitch, Pacing Clin. Electrophysiol, (2007). The appearance of delayed repolarization indicates delayed refractoriness and high risk for conduction block. Alteration in the currents dominating the resting membrane potential as well as ion channel states (e.g., ready, primed, open, closed) participating in late repolarization and slowed intracellular $Ca^{2+}$ cycling can be inferred from the appearance of this "foot." FIGS. 3A-C shows an example of slowed repolarization during phase 3 of action potential.

The second derivative of the signal ($d^2F/dt^2$) locates inflection points (indicating fluctuations in the signal rate of change) at all phase transitions in the action potential. The local minimum of $d^2F/dt^2$ at the end of the rising phase is useful in identifying alterations in early repolarization such as the transient outward current $I_{to}$, late sodium current $I_{Na,late}$, and calcium current $I_{Ca}$. The end of maximum repolarization rate (MxR) identifies a less variable measure of APD, called $APD_{MxR}$, shown by data with 10 μM ranolazine (and 1000 nM BPA. The second derivative method automatically detects the inflection time and voltage between rapid repolarization and slow returning to the baseline.

Improvement. The conventional method of detecting the percent of recovery including $APD_{30/50/80/90}$ cannot detect the elevated $V_m$ during late phase 3 and can gives false readings of short APD ($APD_{30/50}$ case) or extremely long APD ($APD_{90}$). $APD_{MxR}$ using the second derivative method can reliably detect the existence of slowed late phase 3 repolarization and two phases of repolarization. The MxR method provides a novel metric to quantitatively assess late phase 3 slowed repolarization; changes are further quantified by $APD_{80}$-$APD_{MxR}$ (the duration of slow repolarization during late-phase-3 repolarization) or the percent recovery of the action potential from peak voltage at the inflection point ($APR_{MxR}$).

The analytical method of this EXAMPLE uses the voltage and calcium waveform, the first and second derivatives, and exponential decay to extract parameters that quantify all its phases. The parameters include the stimulation delay, rise (excitation), plateau, fall (repolarization of action potential and recovery of CaT), and baseline.

Definition 1. The action potential duration (APD) to the maximum repolarization rate ($APD_{MxR}$) is defined as the time between action potential upstroke and the end of rapid repolarization marked by a local maximum at late repolarization $d^2F/dt^2_{max}$. $APD_{MxR}$ is reported in units of time (typically milliseconds). In some cases, $APD_{MxR}$ has lower variation than other APD metrics such as $APD_{80}$ (APD to 80% repolarization, which is a standard metric).

Definition 2. APD triangulation ($APD_{tri}$) is defined as $APD_{MxR}$-$APD_{50}$ and is reported in units of time (typically milliseconds). ($APD_{50}$ is the APD to 50% repolarization and is a standard metric.) Low variation in $APD_{MxR}$ influences the calculation of $APD_{tri}$.

Definition 3. Late 2-phase repolarization duration is defined as $APD_{80}$-$APD_{MxR}$ and is reported in units of time (typically milliseconds). $APD_{80}$ is the APD to 80% repolarization and is a standard metric.

Definition 4. Late phase repolarization percent recovery of the action potential from peak voltage at the inflection point of MxR is defined as $(V_{peak}-V_{MxR})/V_{peak} \times 100$ and is reported as a percent.

Other metrics quantify all phases of the action potential waveform.

The importance of these metrics is shown by experimental data. The inventors observed a divergence between $APD_{80}$ and $APD_{MxR}$ at the highest BPA concentration (1000 nM) due to the appearance of two-step repolarization. A rapid repolarization during phase 3 was followed by a slowed repolarization near the end of action potential repolarization (late-phase 3 period). The $APD_{MxR}$ metric detects the transition between the two-step repolarization automatically. The appearance of this "foot" of the action potential trace during late repolarization is important for understanding refractory period, sensitivity of voltage-dependent channels, maintenance of the baseline voltage level (phase 4), and vulnerability to phase 3 early afterdepolarization. Changes quantified by $APD_{80}$-$APD_{MxR}$ (the duration of slow repolarization during late-phase-3 repolarization) may be reflected in the subsequent activation, motivating quantification of early activation rate during the stimulation delay, action potential upstroke, and potential formation of triggered activity, which can lead to ventricular arrhythmias.

To evaluate arrhythmic risk clearly and quantitatively, the inventors analyzed dose-dependent changes in triangulation of the action potential, $APD_{tri}$ (defined by $APD_{MxR}$-$APD_{50}$), which has been implicated as a proarrhythmic predictor. See, Guerard et al., J. Pharmacol. Toxicol. Methods, 58, 32-40 (2008); Grunnet, Acta Physiol. (Oxf.) 198 Suppl 676, 1-48 (2010); and Hondeghem, Carlsson, & Duker, Circulation 103, 2004-2013(2001). Previous studies indicated that an increase in $APD_{tri}$ can originate from a blockade of either $I_{Kr}$ or $I_{Ks}$, resulting in a delayed phase 3 repolarization. See Guerard et al., J. Pharmacol. Toxicol. Methods 58, 32-40 (2008); Trenor et al., Channels, 7, 249-262 (2013). The data also showed that specific $I_{Kr}$ blockade by E4031 increases $APD_{tri}$ but that $I_{to}$ blockade by 4-AP or $I_{Ca}$ activation by BayK8644 had no effect on $APD_{tri}$, which the inventor confirmed with computer modeling. The trend of increasing $APD_{tri}$ with a similarly increasing APD would suggest risky $I_{Kr}$ block and can be visualized by plotting $APD_{tri}$ versus $APD_{MxR}$. The slope of the regression line thus increases when $I_{Kr}$ is blocked and is a clear indicator for $I_{Kr}$ block and dose-dependent arrhythmic toxicity.

The measurement results enable identification of a set of ion channels and proteins that are involved in the alterations of cardiac excitation targeted by the chemical compounds. These point to a mechanistic understanding of the chemically induced changes that lead to toxicity such as arrhythmia, altered calcium signaling, and altered contraction (inotropy). These mechanistic insights enable iteration on chemical structure for reducing toxicity.

Cardiac excitation-contraction coupling plays an essential role in linking the action potential to contraction on a beat-to-beat basis through modulating intracellular $Ca^{2+}$ concentration ($Ca_i$) and arrhythmias. Cardiotoxicity of drugs can originate from altering cytoplasmic $Ca_i$ cycling.

Figure 1B:
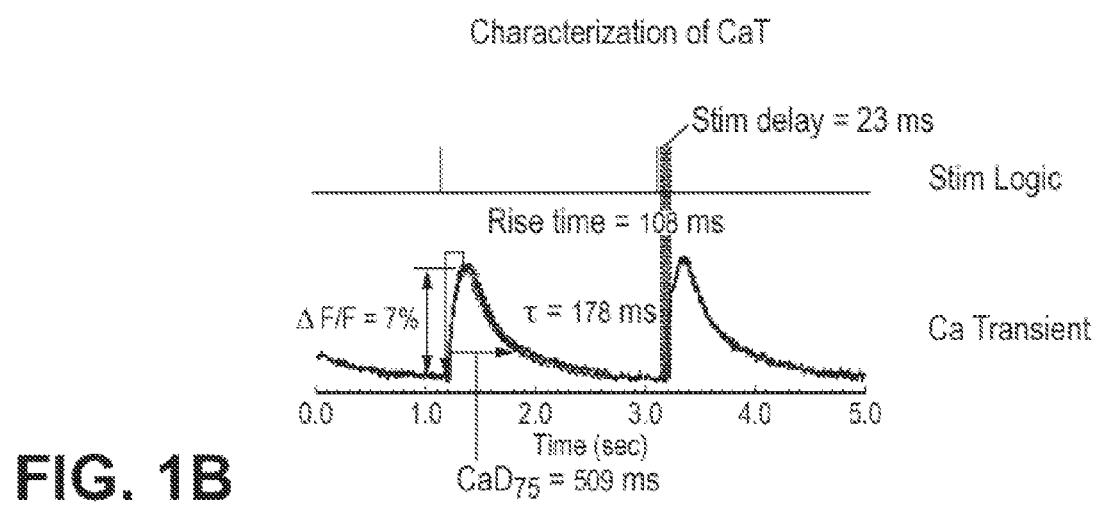
Figure 1C:
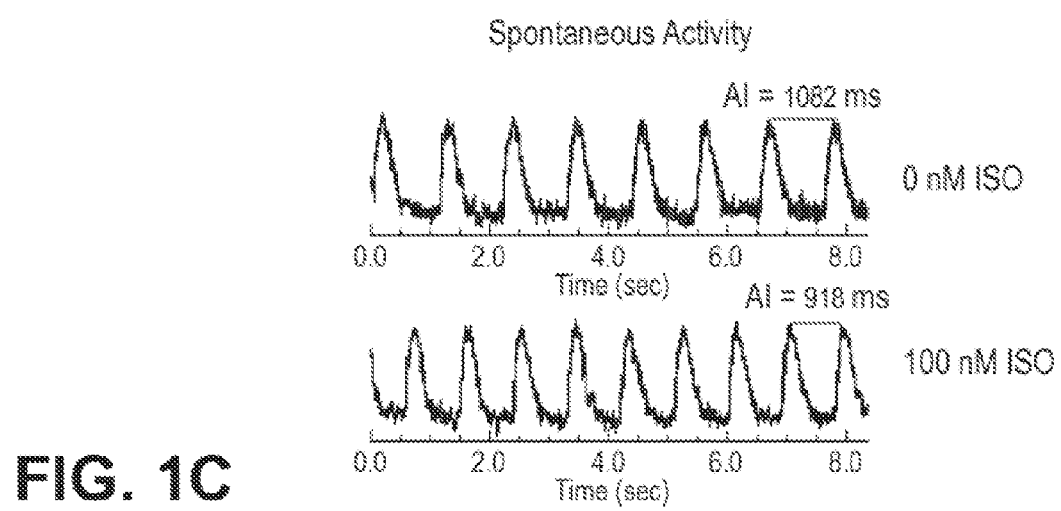
Figure 2A:
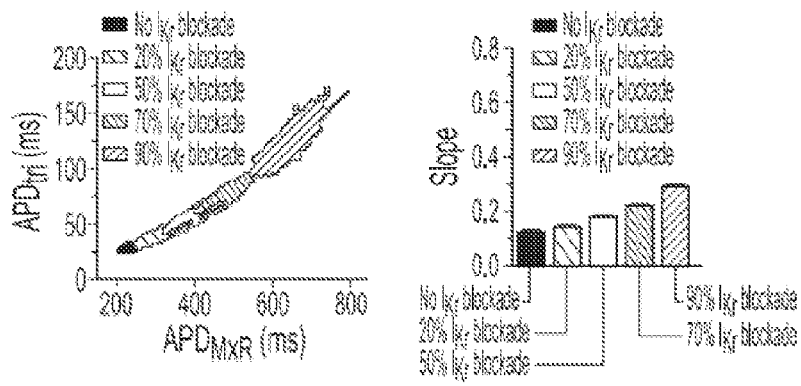
FIGS. 2A-D are a set of four scatter plots and accompanying bar graphs showing the $APD_{tri}$ metric as an indicator of hERG channel blockade. The relationship between APD prolongation and APD triangulation ($APD_{tri}$) can be used to infer hERG channel blockade. The inventors tested three major ion channel modulators that can prolong APD during the early phase ($I_{to}$, phase 1; with 4-AP), plateau phase ($I_{Ca}$, phase 2; with BayK8644), and repolarization ($I_{Kr}$, phase 3; with E4031) of the AP. Since $I_{Kr}$ impacts the later phase of action potential repolarization (phase 3), $I_{Kr}$ blockade delays phase 3 repolarization to increase $APD_{tri}$.
Figure 2B:
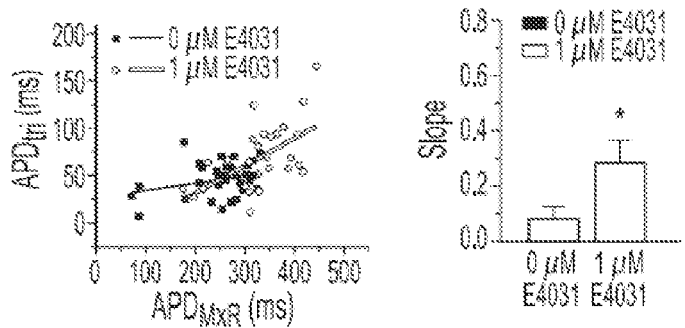
Figure 2C:
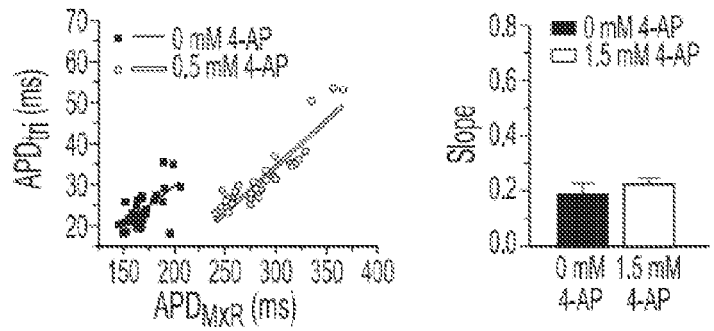
Figure 2D:
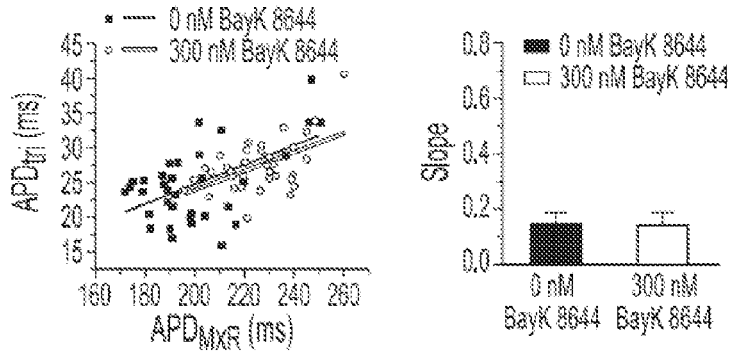

The inventors also developed a platform suitable for cardiotoxicity testing that can detect alteration in $Ca_i$ release and removal processes from hiPSC-CM microtissues by measuring detailed kinetic parameters of $Ca_i$ dynamics during a proposed stimulation protocol as shown in FIGS. 1A-C.

To clearly and quantitatively evaluate safe exposure to chemical compounds, the inventors use quantitative clinical metrics that are indicative of arrhythmia in patients to identify the safe limits in metric fluctuations. This approach may be used on all metrics to identify safe levels of the chemical compounds in humans related to electrophysiology, calcium, and contraction. Compound concentrations in the blood serum and cardiac tissue are critically important for evaluating cardiac safety and cardiotoxicity. Arrhythmia indications are numerous. Clinical corrected QT interval (QTc) increasing >60 milliseconds (or 13%) translates into a limit set as a >13% increase in $APD_{80}$, $APD_{90}$, and/or $APD_{MxR}$. Conduction block (or heart block) severity is measured by excitability, where 50% excitability is akin to 2:1 heart block or loss of half of the QRS complexes on patient ECG. Slow conduction, QRS complex widening (>100 milliseconds, or >100% increase), and induction of ventricular tachycardia are quantified with an increase in stimulation time delay >20 milliseconds and slowed upstroke (>100% increase). Increased metabolic stress, ischemia, and ST segment elevation are quantified with an increase in APD triangulation ($APD_{tri}$) of >10% and APD shortening. QT prolongation, EADs/DADs, and ventricular arrhythmias such as Torsades de Pointes point to $I_{Kr}$ (HERG channel) blockade and are measured by an increase in the slope of the $APD_{tri}$ versus $APD_{MxR}$ relationship before and after chemical compound exposure, which is a high-risk concern for severe arrhythmias and provide an upper dose for safe human exposure.

TABLE 3

Dose-dependent mean differences of action potential metrics (Ranolazine)

| Ranolazine | 2 µm | 10 µm | 100 µm |
|---|---|---|---|
| Rise Time | 0.14355 | 1.02516 | 12.5916 |
| $APD_{30}$ | 4.69162 | 20.71 | 57.9565 |
| $APD_{60}$ | −2.80608 | 20.5335 | 108.574 |
| $APD_{80}$ | 4.62935 | 79.1112 | 242.133 |
| $APD_{MxR}$ | −9.86966 | 13.1316 | 353.211 |
| $APD_{tri}$ | −7.03129 | −7.33741 | 244.733 |

TABLE 4

Dose-dependent mean differences of action potential metrics (BPA)

| BPA | 1 nM | 10 nM | 100 nm | 1000 nM |
|---|---|---|---|---|
| Rise Time | 1.17571 | −0.349716 | −1.73371 | −2.20314 |
| $APD_{30}$ | 34.5043 | −15.3826 | −17.808 | −28.3006 |
| $APD_{60}$ | 37.3566 | −14.0569 | −16.8623 | −31.0489 |
| $APD_{80}$ | 42.7763 | 11.1129 | 10.0440 | −4.64142 |
| $APD_{MxR}$ | 34.0012 | −14.786 | −23.7763 | −40.7783 |
| $APD_{tri}$ | −3.32685 | −0.672005 | −6.82829 | −9.61515 |

The TABLES show the mean dose-response difference of action potential metrics. Red and blue fonts indicate that action potential metrics are statistically significant ($p<0.05$) increase and decrease, respectively, by the paired t-test.

LIST OF EMBODIMENTS

Specific compositions and methods of a human in vitro cardiotoxicity model have been described. The detailed description in this specification is illustrative and not restrictive or exhaustive. The detailed description is not intended to limit the disclosure to the precise form disclosed. Other equivalents and modifications besides those already described are possible without departing from the inventive concepts described in this specification, as those skilled in the art will recognize. When the specification or claims recite method steps or functions in an order, alternative embodiments may perform the functions in a different order or substantially concurrently. The inventive subject matter, therefore, is not to be restricted except in the spirit of the disclosure.

When interpreting the disclosure, all terms should be interpreted in the broadest possible manner consistent with the context. Unless otherwise defined, all technical and scientific terms used in this specification have the same meaning as commonly understood by one of ordinary skill in the art to which this invention belongs. This invention is not limited to the particular methodology, protocols, reagents, and the like described in this specification and, as such, can vary in practice. The terminology used in this specification is not intended to limit the scope of the invention, which is defined solely by the claims.

All patents and publications cited throughout this specification are expressly incorporated by reference to disclose and describe the materials and methods that might be used with the technologies described in this specification. The publications discussed are provided solely for their disclosure before the filing date. They should not be construed as an admission that the inventors may not antedate such disclosure under prior invention or for any other reason. If there is an apparent discrepancy between a previous patent or publication and the description provided in this specification, the present specification (including any definitions) and claims shall control. All statements as to the date or representation as to the contents of these documents are based on the information available to the applicants and constitute no admission as to the correctness of the dates or contents of these documents. The dates of publication provided in this specification may differ from the actual publication dates. If there is an apparent discrepancy between a publication date provided in this specification and the actual publication date supplied by the publisher, the actual publication date shall control.

The terms "comprises" and "comprising" should be interpreted as referring to elements, components, or steps in a non-exclusive manner, indicating that the referenced elements, components, or steps may be present, used, or combined with other elements, components, or steps. The singular terms "a," "an," and "the" include plural referents unless context indicates otherwise. Similarly, the word "or" should cover "and" unless the context indicates otherwise. The abbreviation "e.g." is used to indicate a non-limiting example and is synonymous with the term "for example." The abbreviation "i.e." is used as an explanatory example and is synonymous with the term "that is."

Some embodiments of the technology described can be defined according to the following numbered paragraphs:

1. An in vitro model for cardiotoxicity, comprising:
    (a) human pluripotent stem cell-derived cardiomyocytes; and
    (b) human cardiac fibroblasts,
    in three-dimensional self-assembled microtissues. Cardiomyocytes are purified by lactate-based metabolic selection (to obtain greater than about 60% cardiomyocyte purity) and cardiac fibroblasts are included for increasing the consistency, quality, and reproducibility of the model and of the data collected from the model. Round-bottom recesses or micro-wells are non-adherent, and cells suspended in culture medium are introduced to the micro-wells in defined concentrations to determine microtissue size and settle into the microwell recesses to cluster together. Tissues are formed by cells creating adhesions and junctions with other cells and extracellular matrix proteins. Electrical activity (e.g., the action potential), calcium transients, and contraction are dynamic processes quantified by high-resolution, high-speed imaging to obtain multiple metrics from the waveforms by unbiased, automated analysis to assess cardiotoxicity. Consistent tissue formation, imaging, and analysis are high due to the defined model parameters, and these enable widespread use and adoption.

2. The in vitro model of embodiment 1, wherein the model consists essentially of about 100% hPSC-CM or hPSC-CM$_{LP}$.
3. The in vitro model of embodiment 1, wherein the model consists essentially of about 5% human cardiac fibroblasts.
4. The in vitro model of embodiment 1, wherein the model consists essentially of 5% human cardiac fibroblasts.
5. The in vitro model of embodiment 1, wherein the model consists essentially of about 95% hPSC-CM or hPSC-CM$_{LP}$ and about 5% human cardiac fibroblasts.
6. The in vitro model of embodiment 1, wherein the model consists essentially of about 10% human cardiac fibroblasts.
7. The in vitro model of embodiment 1, wherein the model consists essentially of about 90% hPSC-CM or hPSC-CM$_{LP}$ and about 10% human cardiac fibroblasts.
8. The in vitro model of embodiment 1, wherein the model consists essentially of about 15% human cardiac fibroblasts.
9. The in vitro model of embodiment 1, wherein the model consists essentially of about 95% hPSC-CM or hPSC-CM$_L$p and about 15% human cardiac fibroblasts.
10. A method of making the in vitro model of embodiment 1, comprising the steps of:
    (1) obtaining separate samples of cell-cultured human pluripotent stem cell-derived cardiomyocytes of sufficient purity (>60%) and cell-cultured human cardiac fibroblasts;
    (2) mixing the cell-cultured human pluripotent stem cell-derived cardiomyocytes and the cell-cultured human cardiac fibroblasts in defined ratios;
    (3) pipetting the mixed cells into molds for forming microtissues;
    (4) allowing the mixed cells to settle into microtissue recesses in the molds;
    (5) culturing the mixed cells overnight to allow microtissues to form, wherein the cells of the microtissues are connected through adhesion junctions and functional junctions; and
    (6) culturing the microtissues with electrical stimulation for 1 week and up to several weeks, sometimes in the presence of a chemical compound at a range of concentrations, until the time of use for cardiotoxicity assessment.
11. A method of collecting visual data via imaging of voltage, calcium, and contraction signals, comprising the steps of:
    (1) loading a voltage- or calcium-sensitive dye into the microtissues in culture; cells expressing genetically encoded calcium indicator are used for calcium and voltage signals from the same microtissues.
    (2) sequentially exposing the microtissues to vehicle (either DMSO or ethanol) or chemicals for short time (5-30 minutes) assessing acute responses or maintaining exposure to chemicals used during the culture period for chronic exposure assessment; and
    (3) collecting fluorescent (e.g., voltage or calcium) and/or bright field (e.g., contraction) images with high-speed, high-resolution cameras.
12. A method for automatically analyzing fluorescent imaging data to reduce bias and increase throughput, comprising the steps of:
    (1) identifying the regions of each tissue in the field of view based on the fluorescence intensity;
    (2) using a fast Fourier transform to evaluate responsive and non-responsive tissues, used to calculate excitability;
    (3) masking to eliminate non-excitable tissues, thus reducing computer computational time to speed analysis, and improving reliability of data analysis;
    (4) automated segmentation based on the image constructed from the Fast Fourier Transformation at the pacing frequency;
    (5) calculating the averaged time-series trace per tissue across the area of the tissue;
    (6) eliminating background drift of the trace from water vibration or mechanical noise by $3^{rd}$ to $5^{th}$ order asymmetric least square fitting;
    (7) plotting the fluorescence intensity changes with time expressed in percent defined as a delta function of $\Delta F/F_0 = (F(t)-F_0)/F_0$ where $F_0$ is the baseline calculated in (6);
    (8) taking the first derivative and moving average subtraction to extract peaks, slopes, rise time, and accelerations/decelerations after application of bilateral filter and automatically extracting and calculating all other metrics of the voltage signal (action potential) or calcium transient including takeoff time, peak time, activation time, recovery time (30, 50, 80%);
    (9) automatically detecting arrhythmias (e.g., EADs, DADs) by applying multiple moving average and subtraction to increase fidelity and identifying extra upstrokes during the plateau of action potential; and
    (10) outputting data.
13. A method of using the in vitro model of embodiment 1 to screen compounds for arrhythmogenic cardiotoxicity.
14. The method of screening, wherein the test compounds are in development, testing, or use as pharmaceuticals.
15. The method of screening, wherein the test compounds are for use in industrial chemistries and processes, including agriculture, plastics production, and fire retardants.
16. The method of screening, wherein the test compounds are present in the environment and may be classified as environmental toxicants.
17. The method of evaluating alterations in the rise time of action potential upstroke from moving average subtraction, which is computationally low, mathematically less complex and is less affected by the choice of the window size;
    (1) calculating moving averages of user-defined window size
    (2) subtracting the original trace from the moving averages
    (3) identifying the time points corresponding to the maximum and the minimum of the moving average subtraction,
    (4) measuring the difference between the maximum and minimum time point during the action potential upstroke
18. A method of evaluating alterations in late phase 3 repolarization in a subject, comprising the steps of:
    (1) identifying the end of the rapid or maximum repolarization rate (MxR) in an action potential trace; and
    (2) where the action potential trace does not coincide with the stable baseline of the action potential, identifying the "foot" in the action potential trace, where a duration of elevated membrane potential slowly returns to the baseline voltage level.
19. The method of evaluating alterations, further comprising the step of:

(3) where the late phase 3 early afterdepolarization is an extrasystole that occurs during the late phase of action potential, identifying that the subject has an elevated risk of tachyarrhythmia or conduction block.

20. The method of evaluating alterations, further comprising the step of:
    (3) taking the second derivative of the signal ($d^2F/dt^2$) to locate inflection points at all phase transitions in the action potential repolarization phase.

21. The method of evaluating alterations, further comprising the step of:
    (4) taking the second derivative of the signal ($d^2F/dt^2$) to locate inflection points at all phase transitions in the action potential; and
    (5) identifying alterations in early repolarization.

22. The method of evaluating alterations, wherein the alterations in early repolarization are selected from the group consisting of transient outward current $I_{to}$, late sodium current $I_{Na,late}$, and calcium current $I_{Ca}$.

23. The method of evaluating alterations, wherein the alterations in late phase 3 repolarization are compared with the $APD_{80}$ to calculate the duration of slow repolarization during late-phase-3 repolarization using $APD_{80}$-$APD_{MxR}$ formula. The metric of $APD_{80}$-$APD_{MxR}$ quantifies a high-risk period for extrasystole that can lead to ventricular arrhythmias.

24. The method of evaluating alterations, wherein the voltage level of inflection points between rapid repolarization and slowly returning to the baseline are further quantified by the percent recovery of the action potential from peak voltage at the inflection point ($APR_{MxR}$). The higher the voltage level of inflection point is, the higher risk is for extrasystole to occur.

25. A method, comprising the steps of:
    (1) calculating the second derivative of voltage signal ($d^2F/dt^2$);
    (2) identifying the time point where local maximum of $d^2F/dt^2$ occurs during phase 3 repolarization, which is an inflection point of rapid repolarization and slowly returning baseline;
    (3) measuring $APD_{MxR}$ by subtracting the time point of local maximum of $d^2F/dt^2$-action potential upstroke time point;
    (4) measuring the duration of slowly returning to baseline by $APD_{80}$-$APD_{MxR}$;
    (5) measuring the percent recovery ($APR_{MxR}$) by the voltage level at MxR/action potential amplitude×100; and
    (6) $APR_{MxR}$ smaller than 75% (the voltage level of inflection points 25% above the baseline voltage) is considered late phase 3 early afterdepolarization and quantified to represent high risk for extrasystole;
    wherein the statistical significance of $APD_{80}$-$APD_{MxR}$ greater than 0 is considered that the test compound alters ionic currents responsible for late phase 3 repolarization such as $I_{K1}$ and intracellular $Ca^{2+}$ handling.

26. The method of evaluating changes in all metrics to define a chemical's response pattern or signature response, wherein the amplitude of changes is compared to other compounds for evaluation of safety profile and toxic risk profiles.

27. A method of treatment, comprising the steps of:
    (1) Calculating dose-dependent changes in the in vitro quantitative metrics;
    (2) Evaluating changes in clinical human equivalent metrics including ECG changes, contractility, pressure/volume, and function;
    (3) Set limits on the magnitude of change in the in vitro quantitative metrics to reflect the limits of safety for patient exposure;
    (4) Define the safe chemical exposure profile of the chemical compound for treatment of human patients.

```
SEQUENCE LISTING
Custom primers: ACTA2a (α-smooth muscle actin)

Forward:
                                                (SEQ ID NO: 1)
CCGACCGAATGCAGAAGGA Reverse:
                                                (SEQ ID NO: 2)
ACAGAGTATTTGCGCTCCGAA Custom primers: GJA1 (connexin 43)

Forward:
                                                (SEQ ID NO: 3)
CTTTTGGAGTGACCAGCAAC Reverse:
                                                (SEQ ID NO: 4)
TGAAGCTGAACATGACCGTA
```

REFERENCES

A person of ordinary skill in the cardiotoxicity testing art can use these patents, patent applications, and scientific references as guidance to predictable results when making and using the invention.

Patent Publications

U.S. Pat. No. 8,318,488 B1(Bohlen et al.). The patent provides assay systems for determining the therapeutic or toxic effect of a putative drug based on assaying its activity in cells differentiated in vitro from stem cells and induced to display a phenotype that resembles a disease to be treated.

U.S. Pat. No. 8,497,252 B2 (Hodosa et al.) provides compositions comprising modified stem cells containing a transgene that affects the expression of at least one gene that inhibits or promotes cardiomyogenesis. The patent discloses compositions comprising cardiac stem cells, wherein said cardiac stem cells comprise a transgene encoding a microRNA.

U.S. Pat. No. 8,703,483 B2 (Cezar). The patent provides biomarker profiles of cellular metabolites and methods for screening chemical compounds including pharmaceutical agents lead and candidate drug compounds and other chemicals using human embryonic stem cells (hESC), or lineage-specific cells produced therefrom. The methods are useful for testing toxicity particularly developmental toxicity and detecting teratogenic effects of such chemical compounds.

U.S. Pat. No. 9,085,756 B2 (Fisk). This patent provides a system for producing pancreatic islet cells from embryonic stem cells. Differentiation is initiated towards endoderm cells and focused using reagents that promote emergence of islet precursors and mature insulin-secreting cells. High quality populations of islet cells can be produced in commercial quantities for research drug screening or regenerative medicine.

U.S. Pat. No. 9,273,286 (Ma) discloses compositions and methods for enhancing cardiac differentiation efficiency of stem cells or promoting ventricular and atrial cardiomyocytes formation from stem cells, and the uses of the differentiated cardiomyocytes for repairing cardiac injuries and screening for new medicaments for treating cardiac injuries.

U.S. Pat. No. 10,113,150 B2 (Wakatsuki) discloses an in vitro model for arrhythmogenic cardiotoxicity (engineered heart tissues), and methods provide an in vitro system for modeling and understanding cardiac function. The experiments with proarrhythmic drugs and known cardiotoxins demonstrate the power of using the Palpator system for screening cardiac drugs to detect cardiotoxic drugs in future screenings of unknown compounds and enable discovery of new properties of well-known chemical agents, comprising: (a) human pluripotent stem cell-derived cardiomyocytes; and (b) human cardiac fibroblasts, in three-dimensional self-assembled microtissues. The engineered cardiac tissues include cardiomyocyte cells derived from a pluripotent cell. Models based on human cells will be desirable to test for human-specific cardiotoxicity during the early stages of drug discovery. Fibroblasts used to create the EHTs are suitably cardiac fibroblasts and suitably they are of the same species as the cardiomyocytes used in a tissue. Remodeling capacity of FBs was needed to fabricate compressed 3D tissues that can generate cardiac contraction synchronously upon achieving synchronous contraction, the cardiac twitch force was measured using the Palpator. During incubation, the cells self-assemble into a bio-artificial tissue and compress the collagen matrix by squeezing out liquid thereby reducing the total volume by about ten-fold. Bottoms of the 8-well chambers were sealed with glass coverslips so that EHT cells could be observed using microscopes. Wakatsuki discloses a method of making an in vitro model. The engineered heart tissues (EHT) and methods described provide an in vitro system for modeling and understanding cardiac function, comprising the steps of (1) obtaining separate samples of cell-cultured human pluripotent stem cell-derived cardiomyocytes (engineered cardiac or heart tissues (EHT) provided are based on cardiomyocytes derived from pluripotent cells; (2) mixing the cell-cultured human pluripotent stem cell-derived cardiomyocytes and the cell-cultured human cardiac fibroblasts in defined ratios; (3) pipetting the mixed cells into molds for forming microtissues; (4) allowing the mixed cells to settle into microtissue recesses in the molds; (5) culturing the mixed cells to allow microtissues to form, wherein the cells of the microtissues are connected through adhesion junctions and functional junctions; and (6) culturing the microtissues with electrical stimulation. Fibroblasts used to create the EHTs may be obtained from cell lines fibroblasts are suitably cardiac fibroblasts and suitably they are of the same species as the cardiomyocytes used in a tissue. The fibroblast cells are added separately from the human cardiomyocyte cells to form the tissue. The cells may be derived from human the cardiomyocytes used to generate the tissue are fairly homogenous the source of the cardiomyocytes contains few if any non-cardiomyocyte cells and cell-cultured human cardiac fibroblasts. EHTs fabricated are by mixing cardiomyocytes with mFBs. The ratio of fibroblasts to cardiomyocytes in the tissues used for functional assays should be between about 0.1:1 and about 2:1 a 1:1 ratio of fibroblasts to cardiomyocytes is used. The wells are slightly tapered toward the bottom and the frame is securely positioned about 1 mm above the bottom of the well. The non-polymerized solution of collagen containing cells and appropriate cell culture media as described is poured into the wells. During incubation, the cells self-assemble into a bio-artificial tissue and compress the collagen matrix by squeezing out liquid thereby reducing the total volume by about ten-fold. Cells self-assemble to form a tissue model conforming to the shape of the scaffold or support. EHTs begin to contract coherently within a few days of formation. EHTs were electrically stimulated 60 mV, 1 Hz during mechanical testing. Wakatsuki discloses a method of using the in vitro model to screen compounds for arrhythmogenic cardiotoxicity. The methods evaluate the effects of an agent on cardiac performance. The methods include contacting the tissues with the agent and comparing the cardiac performance of the tissue after contact with the agent to the cardiac performance of a control. The methods confirmed the toxic effect of 5 µM isoproterenol by measuring the decreased twitch force and corresponding decrease. In cellular viability observed arrhythmias after isoproterenol treatment compared to the control EHT, comprising the steps of: (1) loading a voltage-sensitive or calcium-sensitive dye into the microtissues in culture; and (2) sequentially exposing the microtissues to chemicals for a short time of 5-30 minutes and assessing acute responses or maintaining exposure to chemicals used during the culture period for chronic exposure assessment. Drug-induced cardiotoxicity often damages mitochondrial metabolic activity developed additional assays for quantifying the mitochondrial membrane potential (MMP) of EHTs using the cationic potential metric dye tetramethytrhodamine ethyl ester. The effects of daunorubicin and isoproterenol on EHTs cardiac contractility are depicted after a 3-day incubation with and without each drug cellular viability was determined after the contractility assay.

U.S. Pat. No. 10,048,275 B2 (Kralj et al.). The patent identifies compounds by exposing a plurality of cardiomyocytes to a compound wherein the cardiomyocytes express an optogenetic reporter of membrane potential and an optogenetic reporter of calcium level; receiving light from the optogenetic reporter of membrane potential; creating an action potential waveform using the received light; and analyzing the action potential waveform to determine the presence or absence of a risk for arrhythmia associated with the compound.

U.S. Pat. No. 10,113,150 B2 (Invivosciences). The patent describes an engineered cardiac tissue that contains fibroblast cells and an extracellular matrix component.

WO 2017/093524 A1 (Ventana Medical Systems) is in the field of analysis of digitized images of tissue samples. The patent application teaches automatically analyzing data to reduce bias with multiple algorithms. Selecting regions of interest within a single or across multiple serial digitized slides of a tissue sample for automated interpretation and scoring. The system and method reduce or eliminates subjectivity and bias in identifying FOVs. The source may be or include a camera or imaging system that generates a fluorescent image. The computed score values can be interpolated to such a finer grid by employing standard image interpolation methods, such as nearest neighbor interpolation algorithms.

WO 2018/195166 A1 (Coyne Scientific, LLC). This publication discloses a method for estimating the responses of an individual person of interest to a chemical or biological agent before exposing the person to that agent in vivo. Such estimations or predictions may forecast the likelihood and/or magnitude of response by the person of interest. The method uses induced pluripotent stem cells (iPSCs) derived from tissues from the person of interest and both stem cells and relevant medical or health information drawn from several individuals exposed to the agent in vivo.

AU 2014/323098 A1 (Repairon GmbH). This publication is directed to a method for producing bioengineered heart muscle (BHM) from pluripotent stem cells comprising the steps of inducing mesoderm differentiation cardiac differentiation and cardiac maturation by directed tissue formation. The method is a robust serum-free and reproducible way to produce BHM for multiple applications and applies to multiple pluripotent stem cell lines. The publication is also directed to the BHM produced by the method disclosed and to uses of the BHM in pharmacologic and toxicity screenings and its use in medicine.

CA 2,886,396 A1 (Institute of Biophysics, Chinese Academy of Sciences). This publication provides a method for inducing pluripotent stem cells to differentiate into ventricular myocytes in vitro which is achieved by maintaining amplifying and culturing pluripotent stem cells in vitro adding a substance capable of activating the Smad1/5/8 signaling pathway directly or indirectly into the culture medium when pluripotent stem cells are in the middle stage of myocardial differentiation i.e. the period of differentiating into cardiac muscle cells from mesoderm cells or myocardial precursor cells which enables stem cells to differentiate into ventricular myocytes directionally.

Scientific Publications

Abbott & Roepke, Pharmacogenetics of drug-induced arrhythmias. Expert Rev. Clin. Pharmacol., 1, 93-104 (2008).

Achilli et al., Multilayer spheroids to quantify drug uptake and diffusion in 3D. Mol Pharm. 11, 2071-2081 (2014).

Alexandre et al., Anticancer drug-induced cardiac rhythm disorders: Current knowledge and basic underlying mechanisms. Pharmacol. Ther. 189, 89-103, (2018).

Alinejad et al., A systematic review of the cardiotoxicity of methadone. EXCLI J., 14, 577-600 (2015).

Antzelevitch et al. Electrophysiological effects of ranolazine, a novel antianginal agent with antiarrhythmic properties. Circulation 110, 904-910 (2004).

Anversa et al., Absolute morphometric study of myocardial hypertrophy in experimental hypertension. II. Ultrastructure of myocytes and interstitium. Lab. Invest., 38(5), 597-609 (1978).

Anversa et al., Stereological measurement of cellular and subcellular hypertrophy and hyperplasia in the papillary muscle of adult rat. J. Mol. Cell Cardiol., 12(8), 781-795 (1980).

Archer et al. Characterization and validation of a human 3D cardiac microtissue for the assessment of changes in cardiac pathology. Sci. Rep., 8, 10160 (2018).

Armoundas et al., Prognostic significance of electrical *alternans* versus signal averaged electrocardiography in predicting the outcome of electrophysiological testing and arrhythmia-free survival. Heart, 80(3), 251-256 (1998).

Asahi et al., On-chip spatiotemporal electrophysiological analysis of human stem cell derived cardiomyocytes enables quantitative assessment of proarrhythmia in drug development. Sci. Rep. 8(1) (December 2018).

Asahi et al. Electrophysiological evaluation of pentamidine and 17-AAG in human stem cell-derived cardiomyocytes for safety assessment. Eur. J. Pharmacol. 842, 221-230 (2019).

Asazuma-Nakamura et al., Cx43 contributes to TGF-β signaling to regulate differentiation of cardiac fibroblasts into myofibroblasts. Exp Cell Res., 315(7), 1190-1199 (2009).

Barnes & Hollands, Drug-induced arrhythmias. Crit. Care Med., 38, S188-197(2010).

Bashey et al., Growth properties and biochemical characterization of collagens synthesized by adult rat heart fibroblasts in culture. J. Mol. Cell Cardiol., 24(7), 691-700 (1992).

Beauchamp et al., 3D co-culture of hiPSC-derived cardiomyocytes with cardiac fibroblasts improves tissue-like features of cardiac spheroids. Front. Mol. Biosci., 7, 14 (2020).

Beauchamp et al., Development and characterization of a scaffold-free 3D spheroid model of induced pluripotent stem cell-derived human cardiomyocytes. Tissue Eng. Part C Methods 21, 852-861 (2015).

Berenfeld & Efimov, Optical Mapping. Card. Electrophysiol. Clin., 11(3), 495-510 (2019).

Bergmann et al., Dynamics of cell generation and turnover in the human heart. Cell, 161(7), 1566-1575 (2015).

Bergstrom et al., Stem cell derived in vivo-like human cardiac bodies in a microfluidic device for toxicity testing by beating frequency imaging. Lab. Chip 15, 3242-3249.

Bielawski et al., Real-time force and frequency analysis of engineered human heart tissue derived from induced pluripotent stem cells using magnetic sensing. Tissue Eng. Part C Methods (September 2016).

Blinova et al., Comprehensive translational assessment of human-induced pluripotent stem cell derived cardiomyocytes for evaluating drug-induced arrhythmias. Toxicol. Sci., 155(1), 234-47 (2017).

Blinova et al., International multisite study of human-induced pluripotent stem cell-derived cardiomyocytes for drug proarrhythmic potential assessment. Cell Reports, 24(13), 3582-92 (2018).

Bossu et al., A 2015 focus on preventing drug-induced arrhythmias. Expert Rev. Cardiovasc. Ther. 14, 245-253 (2016).

Bouchard et al., Prenatal exposure to organophosphate pesticides and IQ in 7-year-old children. Environ. Health Perspect. 119(8), 1189-95 (August 2011).

Bracken, Why animal studies are often poor predictors of human reactions to exposure. J R Soc. Med. 102(3):120-2 (2009).

Burke et al., Developmental neurotoxicity of the organophosphorus insecticide chlorpyrifos: from clinical findings to preclinical models and potential mechanisms. J. Neurochem. (2017).

Burridge et al., Chemically defined generation of human cardiomyocytes. Nature Methods, 11(8), 855-860 (2014).

Burridge et al. A universal system for highly efficient cardiac differentiation of human induced pluripotent stem cells that eliminates interline variability. PLoS ONE 6, e18293 (2011).

Cardiac Arrhythmia Suppression Trial (CAST) Investigators, Preliminary report: effect of encainide and flecainide on mortality in a randomized trial of arrhythmia suppression after myocardial infarction. N. Engl. J. Med., 321, 406-412 (August 1989).

Chen et al., Application of the cell sheet technique in tissue engineering. Biomed. Reports, 3(6), 749-757 (2015).

Chen, Matsa, & Wu, Induced pluripotent stem cells: at the heart of cardiovascular precision medicine. Nat. Rev. Cardiol. 13, 333-349 (2016).

Chong et al., Human embryonic-stem-cell-derived cardiomyocytes regenerate non-human primate hearts. Nature, 510(7504), 273-277 (2014).

Clay et al., A quantitative description of the E-4031-sensitive repolarization current in rabbit ventricular myocytes. Biophys. J. 69, 1830-1837(1995).

Clement et al., Expression and function of -smooth muscle actin during embryonic-stem-cell-derived cardiomyocyte differentiation. J. Cell Sci., 120(2), 229-238 (2007).

Cohen et al., Applied Multiple Regression/Correlation Analysis for the Behavioral Sciences 3rd edn. (Lawrence Erlbaum Associates, Mahwah, 2003).

Colatsky et al., The comprehensive in vitro proarrhythmia assay (CiPA) initiative—Update on progress. J. Pharmacol. Toxicol. Methods, 81, 15-20 (2016).

Crumb et al., An evaluation of 30 clinical drugs against the comprehensive in vitro proarrhythmia assay (CiPA) proposed ion channel panel. J. Pharmacol. Toxicol. Methods 81, 251-262 (2016).

Curigliano et al., Cardiotoxicity of anticancer treatments: Epidemiology, detection, and management. CA Cancer J. Clin., 66, 309-325 (2016).

Cyprotex. Structural 3D cardiotoxicity assay. (Cytoprex (Evotec), Watertown, MA, USA).

Desai et al., Reversible modulation of myofibroblast differentiation in adipose-derived mesenchymal stem cells. PLoS One, 9(1), e86865 (2014).

Desroches et al., Functional scaffold-free 3-D cardiac microtissues: a novel model for the investigation of heart cells. Am. J. Physiol. Heart Circ. Physiol., 302(10):H2031-42 (2012).

Doble & Kardami, Basic fibroblast growth factor stimulates connexin-43 expression and intercellular communication of cardiac fibroblasts. Mol. Cell Biochem., 143(1), 81-87 (1995).

Dolnikov et al., Functional properties of human embryonic stem cell-derived cardiomyocytes: intracellular Ca2+ handling and the role of sarcoplasmic reticulum in the contraction. Stem Cells, 24(2), 236-245 (2006).

Drimal et al., Cardiovascular toxicity of the first line cancer chemotherapeutic agents: doxorubicin, cyclophosphamide, streptozotocin and bevacizumab. Neuro. Endocrinol. Lett., 27 Suppl. 2, 176-179 (2006).

Duan et al., Anticancer drugs-related QTc prolongation, torsade de pointes and sudden death: Current evidence and future research perspectives. Oncotarget, 9, 25738-25749 (2018).

Dutta et al., Optimization of an in silico cardiac cell model for proarrhythmia risk assessment. Front. Physiol., 8, 616 (2017).

Ebinger, Krishnan, & Schuger, Mechanisms of ventricular arrhythmias in heart failure. Curr. Heart Fail. Rep. 2, 111-117 (2005).

Efimov et al., Optical mapping of repolarization and refractoriness from intact hearts. Circulation, 90, 1469-1480 (1994).

Eghbali et al., Localization of types I, III and IV collagen mRNAs in rat heart cells by in situ hybridization. J. Mol. Cell. Cardiol., 21(1), 103-113 (1989).

Elson. & Mason, General concepts and mechanisms of ventricular tachycardia. Cardiol. Clin. 4, 459-472 (1986).

Evans & Cooke, Cardiac effects of anthracycline treatment and their implications for aeromedical certification. Aviat. Space Environ. Med. 74, 1003-1008 (2003).

Evans et al., TGF-β1-mediated fibroblast-myofibroblast terminal differentiation—the role of smad proteins. Exp. Cell Res., 282(2), 90-100 (2003).

Fahrenbach et al., The relevance of non-excitable cells for cardiac pacemaker function. J. Physiol., 585(Pt 2), 565-578 (2007).

Fassbender, Global in vitro toxicity testing market to reach $8.8 bn by 2023, Outsourcing-pharma.com (Aug. 2, 2018).

Fenichel et al., Drug-induced torsades de pointes and implications for drug development. J. Cardiovasc. Electrophysiol., 15, 475-495 (2004).

Ferdinandy et al., Definition of hidden drug cardiotoxicity: paradigm change in cardiac safety testing and its clinical implications. Eur. Heart J. (2018).

Feric et al., Engineered cardiac tissues generated in the Biowire II: A platform for human-based drug discovery. Toxicol. Sci. (2019).

Fleischer et al., Comprehensive human stem cell differentiation in a 2D and 3D mode to cardiomyocytes for long-term cultivation and multiparametric monitoring on a multimodal microelectrode array setup. Biosens. Bioelectron., 126, 624-31 (2019).

Flitter, Court tosses petition to force U.S. to ban pesticide. Reuters, New York, Jul. 18, 2017.

Franz et al., Cycle length dependence of human action potential duration in vivo. Effects of single extrastimuli, sudden sustained rate acceleration and deceleration, and different steady-state frequencies. J. Clin. Invest. 82, 972-979 (1988).

Gao & Wang, Impact of bisphenol A on the cardiovascular system-Epidemiological and experimental evidence and molecular mechanisms. Int. J. Environ. Res. Public Health., 11(8), 8399-413 (2014).

Gerbin et al., Enhanced electrical integration of engineered human myocardium via intramyocardial versus epicardial delivery in infarcted rat hearts. PLoS One., 10(7), e0131446 (2015).

Gilchrist et al., High-throughput cardiac safety evaluation and multi-parameter arrhythmia profiling of cardiomyocytes using microelectrode arrays. Toxicol. Appl. Pharmacol. 288, 249-257 (2015).

Gintant et al., Evolution of strategies to improve preclinical cardiac safety testing. Nat Rev Drub Discov. 15(7):457-71 (2016).

Gintant et al. Use of human induced pluripotent stem cell-derived cardiomyocytes in preclinical cancer drug cardiotoxicity testing: A scientific statement from the American Heart Association. Circ. Res. 125, e75-e92 (2019).

Granato et al., Generation and analysis of spheroids from human primary skin myofibroblasts: an experimental system to study myofibroblasts deactivation. Cell Death Discov., 3, 17038 (2017).

Grimm et al., A human population-based organotypic in vitro model for cardiotoxicity screening. ALTEX, 35(4), 441-52 (2018).

Grunnet, Repolarization of the cardiac action potential. Does an increase in repolarization capacity constitute a new anti-arrhythmic principle? Acta Physiol. (Oxf) 198 (Suppl 676), 1-48 (2010).

Guerard et al., Selective block of IKs plays a significant role in MAP triangulation induced by IKr block in isolated rabbit heart. J. Pharmacol. Toxicol. Methods 58, 32-40 (2008).

Guglin et al., Introducing a new entity: chemotherapy-induced arrhythmia. Europace, 11, 1579-1586 (2009).

Gupta et al., Antiarrhythmic properties of ranolazine: A review of the current evidence. Int. J. Cardiol. 187, 66-74 (2015).

Haraguchi et al., Electrophysiological analysis of mammalian cells expressing HERG using automated 384-well-patch-clamp. BMC Pharmacol. Toxicol., 16, 39 (2015).

Haverkamp et al., The potential for QT prolongation and pro-arrhythmia by non-anti-arrhythmic drugs: clinical and regulatory implications. Report on a policy conference of the European Society of Cardiology. Cardiovasc. Res., 47, 219-233 (2000).

Hayakawa et al., Cardiomyocyte monolayers based on motion vector analysis. Tissue Engineering: Part C, Vol. 18, No. 1, pgs. 21-32 (Jan. 1, 2012) is in the field of noninvasive method for the characterization of cardiomyocyte contractile behavior and teaches collecting fluorescent and/or bright field images with high-speed, high-resolution cameras. The light microscopic video images of cardiomyocytes were captured with a high-speed camera. Motion vectors were calculated with a high spatiotemporal resolution using a block-matching algorithm. $Ca^{2+}$ fluorescence imaging of cardiomyocyte monolayers was performed simultaneously using a cooled CCD camera. Analyzing fluorescent imaging data increase reliability and increase throughput with a new optimized algorithm and check points for the action potentials and calcium transients of cardiac microtissues. Motion vectors of beating cardiomyocytes were obtained using a block-matching algorithm optimal values of N and w for the motion detection of cardiomyocyte may vary with the observation magnification and the resolution of the employed camera values were determined empirically based on the throughput speed of calculation and accuracy of the block-matching detection. Dose-dependent effects of ACh or EPI on the contractile behavior of cardiomyocytes were clearly observed using the motion analysis method. From the perspectives of throughput volume this technique would be a good candidate for monitoring the contractile characteristics of cardiomyocytes during prolonged culture periods and the effect of drugs on the contractile behavior of cardiomyocytes.

Henning & Harbison, Cardio-oncology: cardiovascular complications of cancer therapy. Future Cardiol., 13, 379-396 (2017).

Heranval et al., Drugs with potential cardiac adverse effects: Retrospective study in a large cohort of parkinsonian patients. Rev. Neurol. (Paris), 172(4-5), 318-23 (2016).

Hoang et al. Quantitatively characterizing drug-induced arrhythmic contractile motions of human stem cell-derived cardiomyocytes. Biotechnol. Bioeng. 115, 1958-1970 (2018).

Hondeghem, Carlsson, & Duker, Instability and triangulation of the action potential predict serious proarrhythmia, but action potential duration prolongation is antiarrhythmic. Circulation 103, 2004-2013 (2001).

Huang et al., Matrix stiffness-induced myofibroblast differentiation is mediated by intrinsic mechanotransduction. Am. J. Respir. Cell Mol. Biol., 47(3), 340-348 (2012).

Interagency Coordinating Committee on the Validation of Alternative Methods (ICCVAM). A strategic roadmap for establishing new approaches to evaluate the safety of chemicals and medical products in the United States (January 2018).

Jackman et al., Engineered cardiac tissue patch maintains structural and electrical properties after epicardial implantation. Biomaterials, 159, 48 (2018).

Jahnke et al., A novel 3D label-free monitoring system of hES-derived cardiomyocyte clusters: A step forward to in vitro cardiotoxicity testing. PLoS One, 8(7), e68971 (2013).

Johannesen et al., Differentiating drug-induced multichannel block on the electrocardiogram: randomized study of dofetilide, quinidine, ranolazine, and verapamil. Clin. Pharmacol. Ther., 96(5), 549-58 (2014).

Johannesen et al., Late sodium current block for drug-induced long QT syndrome, Results from a prospective clinical trial. Clin. Pharmacol. Ther., 99(2), 214-23 (2016).

Juhola et al., Analysis of drug effects on iPSC cardiomyocytes with machine learning. Ann. Biomed. Eng. 49, 129-138 (2021).

Kaiser et al., Optimizing Blended Collagen-Fibrin Hydrogels for Cardiac Tissue Engineering with Human iPSC-derived Cardiomyocytes. ACS Biomater Sci Eng., 5(2): 887-899 (2019).

Kim et al., Directed fusion of cardiac spheroids into larger heterocellular microtissues enables investigation of cardiac action potential propagation via cardiac fibroblasts. PLoS One, 13(5), e0196714 (2018).

Knisley et al., Ratiometry of transmembrane voltage-sensitive fluorescent dye emission in hearts. Physiology, 279 (3), H1421-H1433 (September 2000).

Kofron & Mende, In vitro models of the cardiac microenvironment to study myocyte and non-myocyte crosstalk: bioinspired approaches beyond the polystyrene dish. J. Physiol., 595(12), 3891-3905 (2017).

Kofron et al., Gq-activated fibroblasts induce cardiomyocyte action potential prolongation and automaticity in a three-dimensional microtissue environment. Am. J. Physiol. Heart Circ. Physiol., 313(4), H810-H27 (2017).

Kollmannsberger et al., Tensile forces drive a reversible fibroblast-to-myofibroblast transition during tissue growth in engineered clefts. Sci. Adv. 4(1), eaao4881 (2018).

Kreutziger et al., Developing vasculature and stroma in engineered human myocardium. Tissue Eng. Part A., 17(9-10), 1219 (2011).

Kurokawa & George. Tissue engineering the cardiac microenvironment: Multicellular microphysiological systems for drug screening. Adv. Drug Deliv. Rev., 96, 225-33 (2016).

Lee & Pickham, Basic Cardiac Electrophysiology and Common Drug-induced Arrhythmias. Crit. Care Nurs. Clin. North Am., 28, 357-371 (2016).

Lemoine et al., Human induced pluripotent stem cell-derived engineered heart tissue as a sensitive test System for QT prolongation and arrhythmic triggers. Circ. Arrhythm. Electrophysiol., 11(7), e006035 (2018).

Lian et al., Robust cardiomyocyte differentiation from human pluripotent stem cells via temporal modulation of canonical Wnt signaling. Proc. Natl. Acad. Sci. U.S.A. 109, E1848-1857 (2012).

Lin et al. Culture in glucose-depleted medium supplemented with fatty acid and 3,3',5-triiodo-I-thyronine facilitates purification and maturation of human pluripotent stem cell-derived cardiomyocytes. Front. Endocrinol. (Lausanne) 8, 253 (2017).

Liu et al., Human embryonic stem cell-derived cardiomyocytes restore function in infarcted hearts of non-human primates. Nature Biotechnol., 36(7), 597-605 (2018).

Livak & Schmittgen, Analysis of relative gene expression data using real-time quantitative PCR and the 2 (−Delta C(T)) Method. Methods, 25(4), 402-408 (2001).

Luca Sala et al., MUSCLEMOTION, a versatile open software tool to quantify cardiomyocyte and cardiac muscle contraction in vitro and in vivo. Circulation Research. 2018; 122:e5-e16 (Dec. 27, 2019) describes the MUSCLEMOTION analysis tool.

Ma et al., High purity human-induced pluripotent stem cell-derived cardiomyocytes: electrophysiological properties of action potentials and ionic currents. Am. J. Physiol. Heart Circ. Physiol. 301, H2006-2017 (2011).

Magdy et al., Human induced pluripotent stem cell (hiPSC)-derived cells to assess drug cardiotoxicity: opportunities and problems, Ann. Rev. Pharmacol. Toxicol., 58, 83-103 (2018).

Makarenko, Passive stiffness changes caused by upregulation of compliant titin isoforms in human dilated cardiomyopathy hearts. Circ. Res., 95(7), 708-716 (2004).

Makati et al. Advances in mechanisms of atrial fibrillation: structural remodeling, high-frequency fractionated electrograms, and reentrant AF drivers. J. Interv. Card Electrophysiol. 23, 45-49 (2008).

Mason et al., Electrocardiographic reference ranges derived from 79,743 ambulatory subjects. J. Electrocardiol., 40(3), 228-234 (2007).

McKeithan et al., An automated platform for assessment of congenital and drug-induced arrhythmia with hiPSC-derived cardiomyocytes. Front. Physiol. 8, 766 (2017).

McKim Jr., Building a tiered approach to in vitro predictive toxicity screening: a focus on assays with in vivo relevance. Comb. Chem. High Throughput Screen., 13(2), 188-206 (2010).

Mdaghri et al., Complications cardiaques au cours de l'intoxication aux organophosphorés. Ann. Cardiol. Angeiol. (Paris), 59(2), 114-7 (April 2010).

Methods, A Strategic Roadmap for Establishing New Approaches to Evaluate the Safety of Chemicals and Medical Products in the United States.

Millard et al. Cross-site reliability of human induced pluripotent stem cell-derived cardiomyocyte-based safety assays using microelectrode arrays: Results from a blinded CiPA pilot study. Toxicol. Sci. 164, 550-562 (2018).

Miragoli et al., Electrotonic modulation of cardiac impulse conduction by myofibroblasts. Circ. Res., 98(6), 801-810 (2006).

Munarin et al., Laser-Etched Designs for Molding Hydrogel-Based Engineered Tissues. Tissue Eng. Part C Methods, 23(5), 311-321 (2017). This paper describes the inventors' studies to develop macro-sized engineered cardiac tissues for evaluating electromechanical function including action potentials, calcium transients, contractility, and structural features of tissues that define propagation patterns associated with arrhythmia and contractility deficits. The Munarin reference is in the field of engineered cardiac tissues and teaches culturing the mixed cells overnight, by remodeling of the collagen matrix by fibroblasts, assessed by extent of tissue compaction, was visible after one day of culture. Munarin teaches engineering cardiac tissues used as arrhythmia models and utilized for in vitro drug screening.

Nachimuthu, Assar, & Schussler, Drug-induced QT interval prolongation: mechanisms and clinical management. Ther. Adv. Drug Saf. 3, 241-253 (2012).

Navarrete et al., Screening drug-induced arrhythmia [corrected] using human induced pluripotent stem cell-derived cardiomyocytes and low-impedance microelectrode arrays. Circulation 128, S3-13 (2013).

Ncardia. Ncyte CardioPlate Maestro MEA 96 (2020). The Ncyte CardioPlate is a 96-well plate that arrives preplated with differentiated cardiomyocytes and Cardiomyocyte Culture Medium, ready to detect extra-cellular field potentials by multi-electrode array (MEA) technology on the Maestro™ MEA system.

NDA 21-526/S-002 Approval Letter (2006). Ranexa® ranolazine extended-release tablets.

Nguyen et al. Microscale generation of cardiospheres promotes robust enrichment of cardiomyocytes derived from human pluripotent stem cells. Stem Cell Rep. 3, 260-268 (2014).

O'Hara et al., Simulation of the undiseased human cardiac ventricular action potential: model formulation and experimental validation. PLoS Comput Biol, 7:e1002061 (2011).

O'Reilly et al., Bisphenol A binds to the local anesthetic receptor site to block the human cardiac sodium channel. PloS One, 7(7), e41667 (2012).

Okur et al., Quantitative evaluation of ischemic myocardial scar tissue by unenhanced T1 mapping using 3.0 Tesla MR scanner. Diagn. Interv. Radiol., 20(5), 407-413 (2014).

Onakpoya et al., Post-marketing withdrawal of 462 medicinal products because of adverse drug reactions: a systematic review of the world literature. BMC Med., 14, 10 (2016a).

Onakpoya et al., Worldwide withdrawal of medicinal products because of adverse drug reactions: a systematic review and analysis. Crit. Rev. Toxicol., 46, 477-489 (2016b).

Parish et al. An evaluation framework for new approach methodologies (NAMs) for human health safety assessment. Regul. Toxicol. Pharmacol., 112, 104592 (2020).

Paternoster et al., Using the correct statistical test for the equality of regression coefficients. Criminology, 36(4), 859-866 (1998).

Pellman, Zhang, & Sheikh, Myocyte-fibroblast communication in cardiac fibrosis and arrhythmias: Mechanisms and model systems. J. Mol. Cell. Cardiol. 94, 22-31. https://doi.org/10.1016/j.yjmcc.2016.03.005 (2016).

Pfeiffer-Kaushik et al. Electrophysiological characterization of drug response in hSC-derived cardiomyocytes using voltage-sensitive optical platforms. J. Pharmacol. Toxicol. Methods 99, 106612. https://doi.org/10.1016/j.vascn.2019.106612 (2019).

Pistollato et al., Standardization of pluripotent stem cell cultures for toxicity testing. Expert. Opin. Drug Metab. Toxicol. 8, 239-257 (2012).

Pluromics. Assessment of pro-arrhythmic effects using Pluricyte® Cardiomyocytes on the ACEA xCELLigence® RTCA CardioECR. Version 1.2 (2020).

Pointon et al. From the cover: High-throughput imaging of cardiac microtissues for the assessment of cardiac contraction during drug discovery. Toxicol. Sci. 155, 444-457 (2017).

Polonchuk et al., Cardiac spheroids as promising in vitro models to study the human heart microenvironment. Sci Rep. 7(1), 7005 (2017).

Posnack, The adverse cardiac effects of Di(2-ethylhexyl) phthalate and bisphenol A. Cardiovasc. Toxicol., 14(4), 339-57 (2014).

Prüss-Üstün & Corvalán, Preventing Disease Through Healthy Environments: Towards an Estimate of the Environmental Burden of Disease. World Health Organization, Geneva, Switzerland (2006).

Qu & Vargas, Proarrhythmia risk assessment in human induced pluripotent stem cell-derived cardiomyocytes using the maestro MEA platform. Toxicol. Sci. 147, 286-295 (2015).

Quinn et al., Electrotonic coupling of excitable and nonexcitable cells in the heart revealed by optogenetics. Proc. Natl. Acad. Sci. U.S.A., 113(51), 14852-14857 (2016).

Ramalho & Freitas, Drug-induced life-threatening arrhythmias and sudden cardiac death: A clinical perspective of long QT, short QT and Brugada syndromes. Rev. Port. Cardiol., 37(5), 435-46 (2018).

Ravenscroft et al., Cardiac non-myocyte cells show enhanced pharmacological function suggestive of contractile maturity in stem cell-derived cardiomyocyte microtissues. Toxicol. Sci., 152.1, 99-112 (2016). The journal article shows the enhanced function of cardiac microtissues that include non-myocyte cells that include human primary cardiovascular endothelial cells and human primary cardiac fibroblasts. The cardiomyocytes are embryonic human stem cell derived.

Recanatini et al., QT prolongation through hERG K(+) channel blockade: current knowledge and strategies for the early prediction during drug development. Med. Res. Rev., 25, 133-166 (2005).

Redfern et al., Impact and frequency of different toxicities throughout the pharmaceutical life cycle. The Toxicologist, 114 (S1) (2010).

Richards et al. Human cardiac organoids for the modelling of myocardial infarction and drug cardiotoxicity. Nat. Biomed. Eng. 4, 446-462 (2020).

Riegler et al., Human engineered heart muscles engraft and survive long term in a rodent myocardial infarction model. Circ. Res., 117(8), 720-730 (2015).

Rinn et al., Anatomic demarcation by positional variation in fibroblast gene expression programs. PLoS Genet., 2(7), e119 (2006).

Romero et al., Impact of ionic current variability on human ventricular cellular electrophysiology. Am. J. Physiol. Heart Circ. Physiol. 297, H1436-1445 (2009).

Rook et al., Differences in gap junction channels between cardiac myocytes, fibroblasts, and heterologous pairs. Am. J. Physiol., 263(5 Pt 1), C959-77 (1992).

Rook et al., Single channel currents of homo- and heterologous gap junctions between cardiac fibroblasts and myocytes. Pflugers Arch., 414(1), 95-98 (1989).

Ruan et al., Mechanical stress conditioning and electrical stimulation promote contractility and force maturation of induced pluripotent stem cell-derived human cardiac tissue—Clinical perspective. Circulation, 134(20), 1557-1567 (2016).

Rubart et al., Electrical coupling between ventricular myocytes and myofibroblasts in the infarcted mouse heart. Cardiovasc. Res., 114(3), 389-400 (2018).

Rudzinski et al., Doxorubicin-induced ventricular arrhythmia treated by implantation of an automatic cardioverter-defibrillator. Europace, 9, 278-280 (2007).

Rupert & Coulombe, IGF1 and NRG1 enhance proliferation, metabolic maturity, and the force-frequency response in hESC-derived engineered cardiac tissues. Stem Cells International, 2017, U.S. Pat. No. 7,648,409 (2017). This paper describes the inventors' studies to evaluate IGF1 and neuregulin 1 (NRG1) to impact cardiomyocyte differentiation, proliferation, and maturation of metabolism and electromechanical function in engineered human cardiac tissues.

Rupert & Coulombe, The roles of neuregulin-1 in cardiac development, homeostasis, and disease. Biomark. Insights, 10(Suppl 1), 1-9 (2015).

Rupert et al., Genetically engineered cardiac fibroblasts for electrical maturation of hiPSC-cardiomyocytes in engineered tissues, F-1198, ISSCR 2017 Boston (June 2017). This abstract from the inventors began to evaluate genetically engineering cardiac fibroblasts with connexin 43, a gap junctional protein that is essential for electrical propagation in engineered tissues.

Rupert et al., Human cardiac fibroblast number and activation state modulate electromechanical function of hiPSC-cardiomyocytes in engineered myocardium. Stem Cells International (2020b). This paper describes the inventors' studies to develop hCF composition in tissues for electromechanical and metabolic function, as well as structural changes with hCF disease states (e.g., activation, pre-fibrosis, and structural alterations).

Rupert et al., Hypertrophy changes 3D shape of hiPSC-cardiomyocytes: Implications for cellular maturation in regenerative medicine. Cell Mol. Bioeng., 10(1), 54-62 (2017).

Rupert et al., Practical adoption of state-of-the-art hiPSC-cardiomyocyte differentiation techniques. PloS oOne, 15(3), e0230001 (2020a). This paper describes the inventors' studies to optimize the cardiac differentiation from multiple hiPSC lines (including male and female lines, Asian and Caucasian race/ethnicities) and customize lactate purification for tissue engineering to assess metabolism and electromechanical function.

Sager et al., Rechanneling the cardiac proarrhythmia safety paradigm: a meeting report from the Cardiac Safety Research Consortium. Am. Heart J., 167(3), 292-300 (2014).

Sahli Costabal, Yao & Kuhl, Predicting drug-induced arrhythmias by multiscale modeling. Int. J. Numer. Method Biomed. Eng. 34, e2964 (2018).

Salama & Choi, Imaging ventricular fibrillation. J. Electrocardiol., 40(6 Suppl), S56-61 (2007).

Sattler et al. Ventricular arrhythmias in first acute myocardial infarction: Epidemiology, mechanisms, and interventions in large animal models. Front. Cardiovasc. Med. 6, 158 (2019).

Sekine et al., Endothelial cell coculture within tissue-engineered cardiomyocyte sheets enhances neovascularization and improves cardiac function of ischemic hearts. Circulation, 118(14 Suppl. 1), S145-S152 (2008).

Serrao et al., Myocyte-depleted engineered cardiac tissues support therapeutic potential of mesenchymal stem cells. Tissue Eng. Part A., 18(13-14), 1322 (2012).

Shah et al., Influence of inherent mechanophenotype on competitive cellular adherence. Ann. Biomed. Eng., 45(8), 2036-2047 (2017).

Shinde et al., The role of α-smooth muscle actin in fibroblast-mediated matrix contraction and remodeling. Biochim. Biophys. Acta Mol. Basis Dis., 1863(1), 298-309 (2017).

Singh & Wadhani, Antiarrhythmic and proarrhythmic properties of QT-prolonging antianginal drugs. J. Cardiovasc. Pharmacol. Ther., 9 Suppl. 1:S85-97 (2004).

Singh, Amiodarone: a multifaceted antiarrhythmic drug. Curr. Cardiol. Rep., 8(5), 349-55 (2006).

Sinnecker, Laugwitz, & Moretti, Induced pluripotent stem cell-derived cardiomyocytes for drug development and toxicity testing. Pharmacol. Ther. 143, 246-252. (2014).

Sirenko et al. In vitro cardiotoxicity assessment of environmental chemicals using an organotypic human induced pluripotent stem cell-derived model. Toxicol. Appl. Pharmacol. 322, 60-74 (2017).

Sousa et al., Smooth muscle alpha-actin expression and myofibroblast differentiation by TGFbeta are dependent upon MK2. J. Cell Biochem., 100(6), 1581-1592 (2007).

Strauss et al., Comprehensive in vitro proarrhythmia assay (CiPA) update from a cardiac safety research consortium/Health and Environmental Sciences Institute/FDA Meeting. Ther. Innov. Regul. Sci., 53(4), 519-25 (2019).

Strickland et al., Status of Acute Systemic Toxicity Testing Requirements and Data Uses by U.S. Regulatory Agencies. Regul. Toxicol. Pharmacol., 94: 183-196 (2018).

Sullivan et al., Extracellular matrix remodeling following myocardial infarction influences the therapeutic potential of mesenchymal stem cells. Stem Cell Res. Ther., 5(1), 14 (2014).

Sun et al., Brugada-type pattern on electrocardiogram associated with high-dose loperamide abuse. J. Emerg. Med., 54(4), 484-486 (2018).

Surawicz & Fisch, Cardiac *alternans*: diverse mechanisms and clinical manifestations. J. Am. Coll. Cardiol., 20(2), 483-499 (1992).

Tadic et al., The influence of chemotherapy on the right ventricle: Did we forget something? Clin. Cardiol., 40, 437-443 (2017).

Taggart et al., Human ventricular action potential duration during short and long cycles. Rapid modulation by ischemia. Circulation 94, 2526-2534 (1996).

Takasuna et al., Comprehensive in vitro cardiac safety assessment using human stem cell technology: Overview of CSAHi HEART initiative. J. Pharmacol. Toxicol. Methods, 83, 42-54 (2017).

Takeda et al., Cardiac fibroblasts are essential for the adaptive response of the murine heart to pressure overload. J. Clin. Invest., 120(1), 254-65 (2010).

Takeda et al., Development of in vitro drug-induced cardiotoxicity assay by using three-dimensional cardiac tissues derived from human induced pluripotent stem cells. Tissue Eng. Part C Methods, 24(1), 56-67 (2018).

Tandon et al. Electrical Stimulation Systems for Cardiac Tissue Engineering. Nature Protocols, Vol. 4, Iss. 2, pgs. 155-173 (Jan. 22, 2009) is in the field of electrical stimulation systems for cardiac tissue engineering and teaches and wherein said electrical stimulation occurs for one week and up to several weeks until the time of use for cardiotoxicity assessment. The protocol is designed to allow for delivery of predictable electrical field stimuli to cells duration of the protocol is ten days for 3D cultures. First, those of skill in the neurological art will stop electrical stimulation eight days after seeding the scaffolds. Then, they will place the entire setup on an optical microscope and monitor contractile responses to electrical stimuli. Next, they will increase electrical stimulation amplitude in 0.1 V increments up to 10 V, and the stimulation frequency up to 400 beats per minute. Tandon teaches engineering of synchronously contractile cardiac constructs by culturing cardiac cell with the application of pulsatile electrical fields designed to mimic those present in the native heart.

Tanner & Beeton, Differences in ion channel phenotype and function between humans and animal models. Front Biosci. (Landmark Ed.), 23, 43-64 (2018).

Tiburcy et al., Defined engineered human myocardium with advanced maturation for applications in heart failure modelling and repair. Circulation 135(19):1832-47 (2017).

Tohyama et al., Distinct metabolic flow enables large-scale purification of mouse and human pluripotent stem cell-derived cardiomyocytes. Stem Cell, 12(1), 127-137 (2013).

Trenor et al. In silico assessment of drug safety in human heart applied to late sodium current blockers. Channels 7, 249-262. (2013).

Verheijen et al. Bringing in vitro analysis closer to in vivo: Studying doxorubicin toxicity and associated mechanisms in 3D human microtissues with PBPK-based dose modelling. Toxicol. Lett. 294, 184-192 (2018).

Verkerk et al., Patch-clamp recording from human induced pluripotent stem cell-derived cardiomyocytes: Improving action potential characteristics through dynamic clamp. Int. J. Mol. Sci., 18(9) (2017).

Vicente et al. Comprehensive T wave morphology assessment in a randomized clinical study of dofetilide, quinidine, ranolazine, and verapamil. J. Am. Heart Assoc. https://doi.org/10.1161/JAHA.114.001615 (2015).

Virani et al., Heart disease and stroke statistics-2020 update: A report from the American Heart Association. Circulation 141, e139-e596. (2020).

Vozenin et al., The myofibroblast markers α-SM actin and β-actin are differentially expressed in 2 and 3-D culture models of fibrotic and normal skin. Cytotechnology, 26(1), 29-38 (1998).

Wacker & Noskov, Performance of machine learning algorithms for qualitative and quantitative prediction drug blockade of hERG1 channel. Comput. Toxicol., 6, 55-63 (2018).

Wagner & Dimmeler, Cellular cross-talks in the diseased and aging heart. J Mol Cell Cardiol 138: 136-46 (2020).

Waldo et al. Effect of d-sotalol on mortality in patients with left ventricular dysfunction after recent and remote myocardial infarction. The SWORD Investigators. Survival With Oral d-Sotalol. Lancet, 348, 7-12 (1996).

Walsh et al., Beta-adrenergic modulation of cardiac ion channels. Differential temperature sensitivity of potassium and calcium currents. J. Gen. Physiol., 93(5), 841-54 (1989).

Weiss et al., Early afterdepolarizations and cardiac arrhythmias. Heart Rhythm 7, 1891-1899 (2010).

Wendel et al., Functional effects of a tissue-engineered cardiac patch from human induced pluripotent stem cell-derived cardiomyocytes in a rat infarct Model. Stem Cells Transl. Med., 4(11), 1324 (2015).

Wu et al., Augmentation of late sodium current unmasks the proarrhythmic effects of amiodarone. Cardiovasc. Res., 77(3), 481-8 (2008).

Xie et al., So little source, so much sink: requirements for after depolarizations to propagate in tissue. Biophys. J. 99, 1408-1415 (2010).

Yan et al., Bisphenol A and 17beta-estradiol promote arrhythmia in the female heart via alteration of calcium handling. PloS One, 6(9), e25455 (2011).

Yang, Chuang, & Li, The development of congestive heart failure and ventricular tachycardia after first exposure to idarubicin in a patient with acute myeloid leukaemia. Br. J. Clin. Pharmacol., 69, 209-211 (2010).

Zeng et al., Resolving the reversed rate effect of calcium channel blockers on human-induced pluripotent stem cell-derived cardiomyocytes and the impact on in vitro cardiac safety evaluation. Toxicol. Sci. 167, 573-580 (2019).

Zhang et al., Generation of quiescent cardiac fibroblasts from human induced pluripotent stem cells for in vitro modeling of cardiac fibrosis. Circulation Research, 125 (5), 552-66 (2019).

Zhao et al., A multimaterial microphysiological platform enabled by rapid casting of elastic microwires. Adv. Healthc. Mater., 8(5), e1801187 (2019).

Zhao et al., A platform for generation of chamber-specific cardiac tissues and disease modeling. Cell, 176(4), 913-27 (2019).

Zhou & Pu, Recounting cardiac cellular composition. Circ. Res., 118(3), 368-370 (2016).

Zhou et al., Characterization and standardization of cultured cardiac fibroblasts for ex vivo models of heart fibrosis and heart ischemia. Tissue Eng. Part C Methods, 23(7), 422-433 (2017).

Zuppinger, 3D Cardiac Cell Culture: A Critical Review of Current Technologies and Applications. Front Cardiovasc Med. 6, 87 (2019).

We claim:

1. A method for screening a test compound for potentially causing an arrhythmogenic risk, an extrasystole risk, or for potentially causing a late-phase 3 early afterdepolarization risk in a human heart, the method comprising the steps of:

(1) obtaining an in vitro model for cardiac assessment comprising three-dimensional (3D), human heart engineered tissues, the tissues comprising a voltage-sensitive dye operative to fluoresce in a response to an intracellular calcium ($Ca^{2+}$) concentration change and/or a response to a change in a voltage, a camera operative to capture fluorescence images to provide a fluorescence and/or a voltage signal, and the camera is in a communication with a computer with software;

(2) obtaining an action potential trace comprising a voltage signal from the in vitro model by acquiring fluorescent images of the tissues using the camera, computer, and software and using the software to calculate an average of the fluorescence images operative to detect a change in voltage and/or in calcium in the tissues; and identifying an end of a rapid or maximum repolarization (MxR) in the action potential trace, and calculating an $APD_{80}$ by identifying an action potential duration (APD) to 80% repolarization;

wherein a moving average subtraction of a voltage signal in the action potential trace is utilized to locate one or more inflection points at all phase transitions in the action potential; and a maximum peak of the moving average subtraction is utilized to calculate a termination of the action potential used to calculate an action potential duration MxR ($APD_{MxR}$);

(3) contacting the 3D human heart engineered tissues with the test compound and then re-obtaining the action potential trace in step (2) and comparing the action potential trace without the test compound to the action potential trace with the test compound;

wherein if the $APR_{MxR}$ after contacting is smaller than 75% is considered late phase 3 early afterdepolarization and quantified to represent high risk for extrasystole.

2. The method of claim 1, further comprising the steps of:
locating where the action potential trace does not coincide with a stable baseline of the action potential trace, and identifying an area of the action potential trace or a foot that is above said stable baseline of the action potential trace, the foot indicating where a duration of elevated membrane potential slowly returns to the baseline voltage level or stable baseline, and
diagnosing that the appearance of the foot is an indication of a high risk to a late-phase 3 early afterdepolarization, wherein the late-phase 3 early afterdepolarization is an extrasystole that occurs during a late phase of the action potential and has an elevated risk to propagate and form reentry, thereby leading to tachyarrhythmias.

3. The method of claim 1, further comprising the steps of:
taking the second derivative of the signal ($d^2F/dt^2$) to locate inflection points at all phase transitions in the action potential; and
identifying alterations in early repolarization.

4. The method of claim 3, further comprising wherein each of one or more alterations in an action potential upstroke are each selected from the group consisting of sodium current $I_{Na}$.

5. The method of claim 1, further comprising the step of identifying alterations in an early repolarization; wherein the alterations in early repolarization are identified using a local minimum of the moving average subtraction at an end of a rising phase of the action potential; and the alterations are selected from the group consisting of transient outward current $I_{to}$, late sodium current $I_{Na,late}$, and calcium current $I_{Ca}$.

6. The method of claim 5, further comprising wherein the alterations in early repolarization are compared with the $APD_{MxR}$ or a duration of slow repolarization during a late-phase-3 repolarization.

7. The method of claim 1, further comprising wherein one or more durations of a slow repolarization are further quantified by $APD_{80}$-$APD_{MxR}$, wherein $APD_{80}$ is the action potential duration (APD) to 80% repolarization.

8. The method of claim 1, further comprising wherein a severity of a slow phase 3 repolarization is further quantified by a percent recovery of the action potential from peak voltage at the inflection point ($APR_{MxR}$).

9. A method of evaluating alterations of claim 1 further comprising the steps of:
calculating a moving average subtraction; and
measuring a time between a minimum and a maximum of the moving average subtraction.

10. The method of claim 1, wherein the test compound includes an environmental compound, a pharmaceutical compound, a chemical, a toxicant, or a new compound.

11. The method of claim 1, and wherein an APD80-$APD_{MxR}$ greater than 0 is indicative that the test compound alters ionic currents responsible for late phase 3 repolarization.

* * * * *